US011334074B2

United States Patent
Guptha et al.

(10) Patent No.: US 11,334,074 B2
(45) Date of Patent: May 17, 2022

(54) SYSTEM AND METHOD FOR INTEGRATED AUTO-STEERING AND AUTO-BRAKING MECHANISM IN AUTONOMOUS VEHICLES AS A RETRO FIT

(71) Applicant: Infosys Limited, Bangalore (IN)

(72) Inventors: Bupalam Prasanna Sreekanta Guptha, Mysore (IN); Saraswathi Thippaiah, Mysore (IN); Nahas Pareekutty, Mysore (IN); Veerabhadrappa Karadakal, Mysore (IN); Kishore Nagaraj, Bangalore (IN); Akash Mangaluru Ramananda, Mysore (IN)

(73) Assignee: INFOSYS LIMITED, Bangalore (IN)

( * ) Notice: Subject to any disclaimer, the term of this patent is extended or adjusted under 35 U.S.C. 154(b) by 248 days.

(21) Appl. No.: 16/681,505

(22) Filed: Nov. 12, 2019

(65) Prior Publication Data
US 2020/0150659 A1    May 14, 2020

(51) Int. Cl.
*G05D 1/00* (2006.01)
*B60T 7/12* (2006.01)
(Continued)

(52) U.S. Cl.
CPC .............. *G05D 1/0088* (2013.01); *B60T 7/12* (2013.01); *B60W 10/04* (2013.01); *B60W 10/18* (2013.01);
(Continued)

(58) Field of Classification Search
CPC .......... G05D 1/0088; B60T 7/12; B60T 7/04; B60W 10/04; B60W 10/18; B60W 10/20;
(Continued)

(56) References Cited

U.S. PATENT DOCUMENTS

| | | | |
|---|---|---|---|
| 5,232,238 A | * | 8/1993 | Ducote ................. B62D 13/02 280/426 |
| 6,817,437 B2 | | 11/2004 | Magnus et al. |

(Continued)

FOREIGN PATENT DOCUMENTS

| | | |
|---|---|---|
| CN | 203592907 U | 5/2014 |
| CN | 107161207 A | 9/2017 |

(Continued)

OTHER PUBLICATIONS

European Search Report for EP Application No. 19208529.8, dated Mar. 16, 2020, pp. 1-10.

(Continued)

*Primary Examiner* — Nicholas Kiswanto
*Assistant Examiner* — Jamal A Shah
(74) *Attorney, Agent, or Firm* — Troutman Pepper Hamilton Sanders LLP (Rochester)

(57) ABSTRACT

A system and/or a method for integrated auto-steering apparatus, auto-braking apparatus and auto-acceleration apparatus to facilitate actuating brake and turning steering wheel without a driver. The technology may be made as a part of Drive-By-Wire system to make the system retrofit using a spur gear train connected through a motor to make steering automatic, and using an electric actuator to make braking automatic, and integrating all the apparatus though a programmable logic controller to achieve navigation of autonomous vehicle. The complete system design fits at the steering column and the brake pedal to imitate exact behavior of human with sensor feedback system.

16 Claims, 13 Drawing Sheets

(51) Int. Cl.
*B60W 10/04* (2006.01)
*B60W 10/18* (2012.01)
*B60W 10/20* (2006.01)
*B60W 30/18* (2012.01)
*B60W 50/00* (2006.01)
*B62D 5/04* (2006.01)
*B62D 6/00* (2006.01)
*B60T 7/04* (2006.01)

(52) U.S. Cl.
CPC ............ *B60W 10/20* (2013.01); *B60W 30/18* (2013.01); *B60W 50/00* (2013.01); *B62D 5/0463* (2013.01); *B62D 6/00* (2013.01); *B60T 7/04* (2013.01); *B60W 2050/0028* (2013.01); *B60W 2710/18* (2013.01); *B60W 2710/20* (2013.01); *B60W 2720/106* (2013.01)

(58) Field of Classification Search
CPC ................ B60W 30/18; B60W 50/00; B60W 2050/0028; B60W 2710/18; B60W 2710/20; B60W 2720/106; B62D 5/0463; B62D 6/00
See application file for complete search history.

(56) References Cited

U.S. PATENT DOCUMENTS

| | | | |
|---|---|---|---|
| 9,164,508 B1 | 10/2015 | Takach, Jr. | |
| 9,499,202 B2 | 11/2016 | Lewis et al. | |
| 2004/0040400 A1* | 3/2004 | Pilz | G05G 1/30 74/480 R |
| 2007/0272471 A1* | 11/2007 | Kuroumaru | B62D 5/0412 180/444 |
| 2015/0346724 A1* | 12/2015 | Jones | B60W 50/087 701/23 |
| 2016/0334790 A1* | 11/2016 | Rust | B60T 7/22 |
| 2017/0261988 A1 | 9/2017 | Owens et al. | |
| 2018/0148051 A1 | 5/2018 | Lujan et al. | |

FOREIGN PATENT DOCUMENTS

| | | |
|---|---|---|
| DE | 3742012 A1 | 6/1989 |
| EP | 2765045 A1 | 8/2014 |
| EP | 2338029 B1 | 5/2017 |
| GB | 2552803 A | 2/2018 |

OTHER PUBLICATIONS

Sahoo, S. et al., "Design and Development of a Heading Angle Controller for an Unmanned Ground Vehicle", International Journal of Automotive Technology: vol. 16, No. 1, pp. 27-37, (2015).

Crimmins, R. et al., Autonomous Ground Vehicle Prototype via Steering-, Throttle-, and Brake- by Wire Modules, (2016).

Brandon, A., "Retrofit Kit Allows Cars to Drive Themselves", New Atlas (2019).

"Retrofit Steering Column Installation Instructions", Ford, www.ididitinc.com (2010).

Wang, J. et al., "Hierarchical Coordinated Control Method of In-Wheel Motor Drive Electric Vehicle Based on Energy Optimization", World Electric Vehicle Journal (2019).

Wang, J. et al., "Coordinated active steering and four-wheel independently driving/braking control with control allocation", American Control Conference (2015).

Heesen, M. et al., "Interaction design of automatic steering for collision avoidance: challenges and potentials of driver decoupling", German Aerospace Center, Germany (2015).

Drage, T et al., IEEE Intelligent Transportation systems Magazine, vol. 6, Issue 4, Winter 2014.

Fahimi, F., "Full drive-by-wire dynamic control for four-wheel-steer all-wheel-drive vehicles",Vehicle System Dynamics, 51:3, 360-376, DOI: 10.1080/00423114.2012.743668, (2013).

* cited by examiner

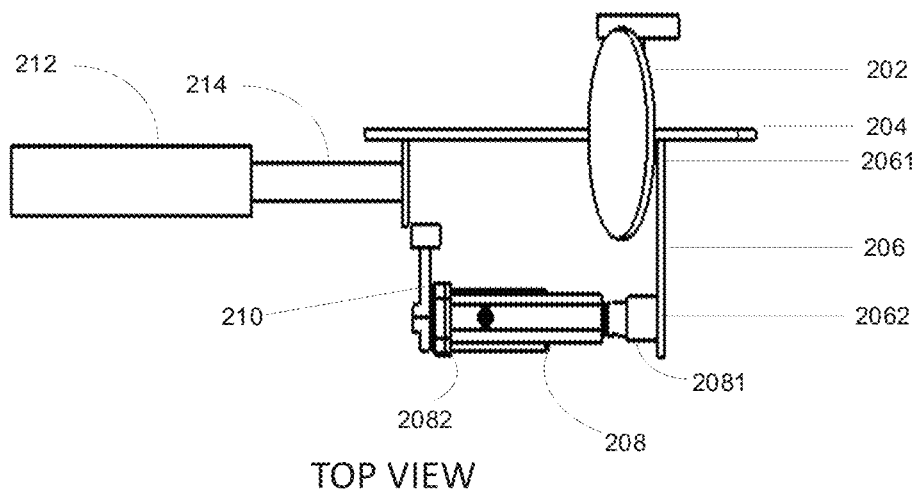
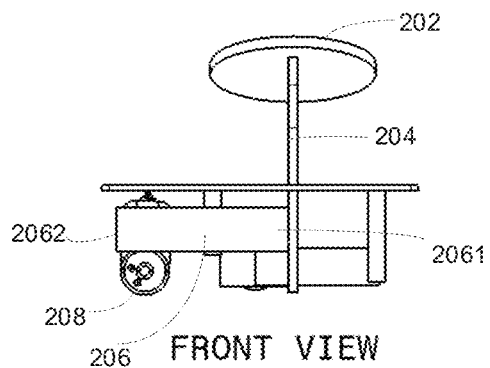

Electric Actuator

FIGURE 3A  FIGURE 3B

SYSTEM AND METHOD FOR INTEGRATED AUTO-STEERING AND AUTO-BRAKING MECHANISM IN AUTONOMOUS VEHICLES AS A RETRO FIT

This application claims the benefit of Indian Non-provisional Patent Application Serial No. E-2/3532/2019/CHE, filed Nov. 11, 2019, which claims the benefit of Indian Provisional Patent Application Serial No. 201841042450, filed Nov. 12, 2018, which is hereby incorporated by reference in its entirety.

FIELD

The field generally relates to autonomous vehicles. In particular, the present technique relates to system and/or method for auto-steering, auto-braking and auto-acceleration mechanism in autonomous vehicles.

BACKGROUND

The fourth industrial revolution is a fourth major industrial era since the industrial revolution of $18^{th}$ century, which is characterized by cyber-physical systems. It is marked by emerging technology breakthroughs in number of fields, including autonomous vehicles. Vehicles relying on automation can be classified as semi-autonomous and autonomous. With technological revolution in integrated circuits, the sophistication of automation has increased in many folds. Drive-By-Wire system (DBW), also referred as Steer-By-Wire in automotive industry is the use of electrical or electro-mechanical systems for performing vehicle functions traditionally achieved by mechanical linkages/operations. Though there are multifold improvements the automotive industry, traditional physical or dimensional constraint in the vehicle still remain one of the major constraints.

The present technologies around Drive-By-Wire system is technically complex, occupies more space, uses pneumatic options and few technologies use electronic systems with limitation of smaller size. The Drive-By-Wire technology for auto steering and auto braking is currently through various actuators, making it very complex.

Hence, there is a need for a solution to overcome the above mentioned problems.

SUMMARY

Disclosed are a system and/or a method for integrated auto-steering, auto-braking and auto-accelerating mechanism in autonomous vehicles as a retro fit.

In one aspect, the integrated system (also referred as 'Drive-By-Wire system') for autonomous vehicles is disclosed. The Drive-By-Wire system comprises one or more components such as, but not limited to, an auto-steering apparatus with integrated spur gears, an auto-braking apparatus with an electric actuator, an auto-acceleration apparatus, at least one sensor, at least one programmable logic controllers, one or more processors and/or one or more memory devices. The auto-steering apparatus with integrated spur gears may comprise a connecting rod with a spur gear operatively coupled to an Electric Power Steering (EPS) motor through at least one spur gear. The connecting rod with a spur gear may be coupled to steering shaft using a pair of universal joints. The EPS motor may be communicatively coupled to the at least one programmable logic controller to operate the EPS motor through one or more electric signals. The at least one programmable logic controller and/or one or more processors may be configured to actuate at least one of the auto-steering apparatus, auto-braking apparatus and/or auto-acceleration apparatus. The actuation causes at least one of, change in position of the autonomous vehicle from a first position to a second position, change in direction of the orientation of the autonomous vehicle from a first direction of orientation to a second direction of orientation, and/or change in speed of movement of the autonomous vehicle. The change in direction of orientation of the autonomous vehicle may be caused as a result of change in angle of rotation of steering wheel associated with the auto-steering mechanism.

In another aspect, an apparatus for auto-braking apparatus is disclosed. The apparatus comprises one or more components, but not limited to, a brake cylinder, a piston rod mechanically coupled to the brake cylinder, a brake pedal mechanically coupled to the piston rod, a brake pad mechanically coupled to the brake pedal, electric actuator and at least one programmable logic controller. The electric actuator is configured to receive one or more signals from the at least one programmable logic controller. One end of the electric actuator is mechanically coupled to first end of the brake pedal using a support clamp and another end of the electric actuator is mechanically coupled to second end of the brake pedal using a pivot pin. Based on the received one or more signals, the electric actuator causes—pushing the brake pad coupled to the brake pedal in a first direction, further causing the brake of the autonomous vehicle to engage. The engage of the brake may cause the autonomous vehicle to either slowdown or stop. The first direction of movement of the brake pad may be in the direction opposite to the brake cylinder. Also, based on the received one or more signals, the electric actuator may cause—pulling the brake pad coupled to the brake pedal in a direction opposite to the first direction, further causing the brake of the autonomous vehicle to disengage. The first end of the brake pedal may be positioned in a direction opposite to the brake piston. The second end of the brake pedal may be mechanically coupled to the brake piston.

In yet another aspect, an apparatus for auto-steering apparatus is disclosed. The apparatus may comprise, one or more components, but not limited to, a steering wheel, a steering shaft, a pair of universal joints, an Electric Power Steering (EPS) motor with a spur gear, a connecting rod integrated with a spur gear operatively coupled with the steering shaft and the EPS motor, at least one sensor and/or at least one programmable logic controller. The connecting rod is mechanically coupled to the steering shaft at one end and to a tie rod at another end through the pair of universal joints. The spur gear associated with the connecting rod is operatively coupled to the spur gear associated with the EPS motor. EPS motor is configured to receive one or more signals from the at least one programmable logic controller, causing the steering wheel to rotate in a first rotational direction or a direction opposite to the first rotational direction, further causing change in angle of orientation of the steering wheel. The angle of orientation of the steering wheel may be determined through at least one sensor. The number of rotations in the EPS motor may be determined by the at least one programmable logic controller, based on at least one of: data received by the at least one sensor and/or point cloud data received by the at least one sensor.

In yet another aspect, a computer implemented method for integrated auto-steering, auto-braking and auto-acceleration mechanism in an autonomous vehicle is disclosed. The method comprising steps wherein one or more position and orientation data of the autonomous vehicle is received at the master controller. One or more way points to determine trajectory of the autonomous vehicle is also received at the master controller. Based on the determined trajectory, the master controller is configured to send one or more instructions to at least one of auto-steering apparatus, auto-braking apparatus and/or auto-acceleration apparatus. Based on the instruction received from the master controller, the auto-steering apparatus of the autonomous vehicle causes the steering wheel to rotate towards a direction, by an angle, determined by the master controller. Based on the instruction received from the master controller, the auto-braking apparatus of the autonomous vehicle causes the autonomous vehicle to either slowdown the speed of the autonomous vehicle or stop the autonomous vehicle. Based on the instruction received from the master controller, the auto-acceleration apparatus of the autonomous vehicle causes either acceleration or deceleration of the autonomous vehicle through an accelerator pedal interface.

The rotation of the steering wheel may be caused by sending instructions from a master controller to a motor controller, through the at least one programmable logic controller, for operating steering shaft through a steering motor operatively coupled using integrated spur gear. The slowdown or stopping of the autonomous vehicle may be caused, by sending instructions from the master controller to the motor controller, through the at least one programmable logic controller, for operating brake pedal through a brake actuator operatively coupled with the brake pedal. The rotation of the steering wheel may further cause the autonomous vehicle to change the direction of movement, when the autonomous vehicle is in motion. The one or more position and orientation data of the autonomous vehicle and the one or more way points are processed using a model predictive control algorithm.

The hardware and software components of the integrated auto-steering and auto-braking mechanism may be controlled through a master controller. Based on the instructions from the application which may be coupled with LIDAR, the master controller may send instructions to controller interface. The controller interface may be communicatively coupled with a motor controller which in turn may send instructions to steering motor and brake actuator to operate steering shaft and brake pedal respectively. A steering angle encoder (also referred as steering angle sensor) may be used to determine angle of the steering/steering wheel. Based on mapping and localization using Point Cloud Data, trajectory for motion of the vehicle may be determined, and through Drive-By-Wire system comprising steering control, acceleration control and brake control, the desired speed and direction of movement of autonomous vehicle may be achieved.

BRIEF DESCRIPTION OF THE DRAWINGS

Example embodiments are illustrated by way of example and not limitation in the figures of the accompanying drawings, in which like references indicate similar elements and in which:

FIG. 2A is a top perspective view depicting apparatus for auto-braking mechanism, according to one or more embodiments.

FIG. 2B is a front perspective view depicting apparatus for auto-braking mechanism, according to one or more embodiments.

FIG. 3A is a left perspective view depicting apparatus for auto-steering mechanism, according to one or more embodiments.

FIG. 3B is a front perspective view depicting apparatus for auto-steering mechanism, according to one or more embodiments.

Other features of the present embodiments will be apparent from the accompanying drawings and from the detailed description that follows.

DETAILED DESCRIPTION

The objective of invention in the present disclosure is to overcome the problem mentioned in the background section with a universal solution which can be used in any type of electrical/autonomous vehicle and other vehicles with few customization, by making Drive-By-Wire system retrofit which may not demand any major component changes in the electrical vehicle and to make system operational. Hence, the steering column of the electric vehicle is analyzed and connecting rod which connects the tie rod end is replaced by mechanism disclosed in the invention which may make the drive controllable through combination of hardware and software. In order to achieve the objective, the steering system may be modified with integrated spur gear electronic power steering system which enables the steering to rotate through one or more program logics.

Another objective of the invention is the implementation of auto-braking mechanism as a retro fit by assembling an actuator to actuate brake pedal wherein the actuator may be operated through one or more program logics.

Yet another objective of the invention is the integration of auto-steering, auto-braking mechanism and auto-acceleration mechanism in an autonomous vehicle.

Figure 1:
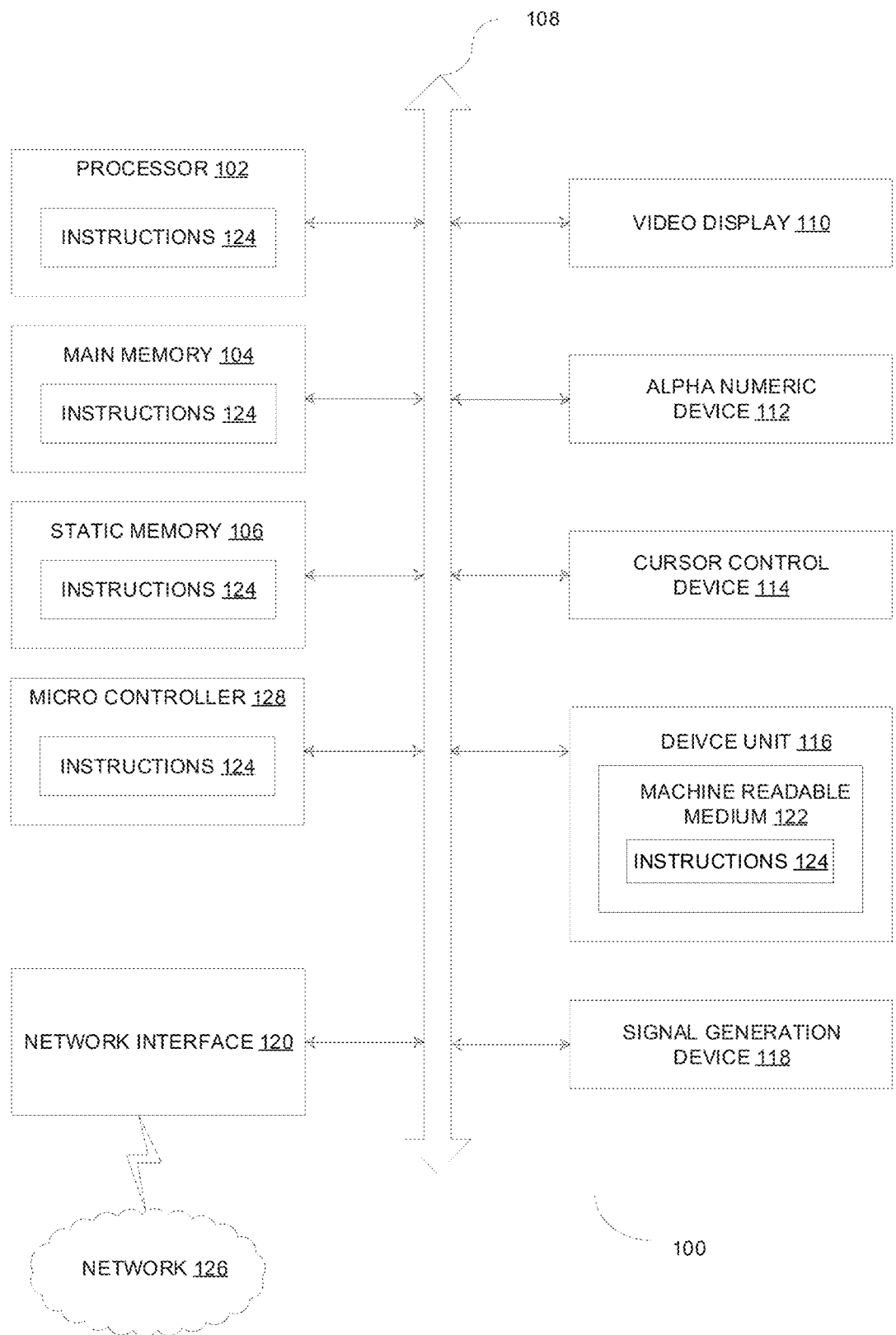
FIG. 1 is a diagrammatic representation of a data processing system capable of processing a set of instructions to perform any one or more of the methodologies herein, according to one or more embodiments.

FIG. 1 is a diagrammatic representation of a data processing device capable of processing a set of instructions to perform any one or more of the methodologies herein, according to one embodiment. FIG. 1 shows a diagrammatic representation of machine and/or the data processing device in the example form of a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), micro controller 128 (e.g., programmable logic controller) and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

FIG. 2A is a top perspective view depicting apparatus for auto-braking mechanism, according to one or more embodiments. FIG. 2B is a front perspective view depicting apparatus for auto-braking mechanism, according to one or more embodiments.

Figure 2C:
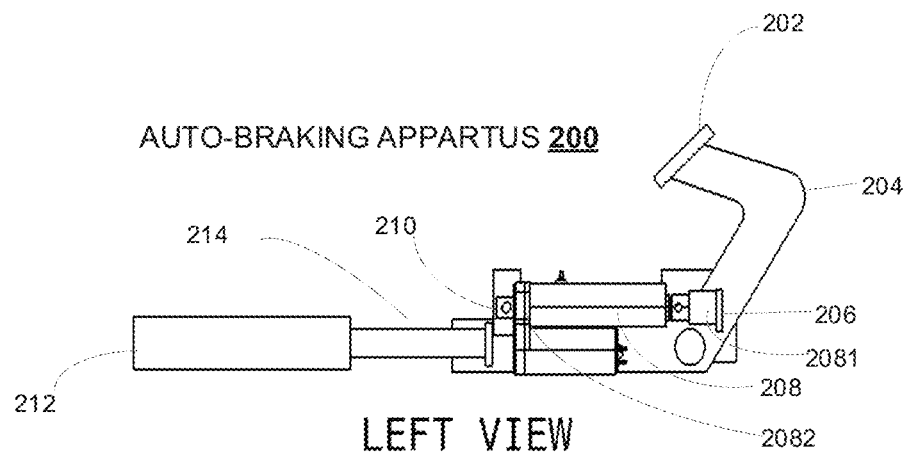
FIG. 2C is a left perspective view depicting apparatus for auto-braking mechanism, according to one or more embodiments.
Figure 2D:
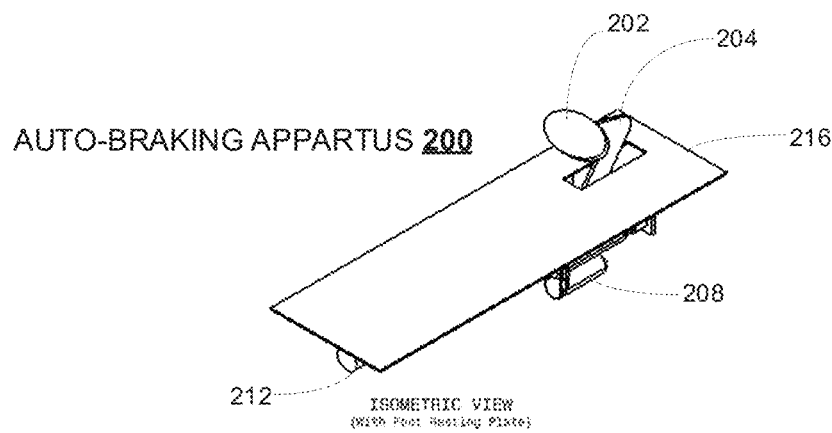
FIG. 2D is an isometric view depicting apparatus for auto-braking mechanism with foot resting plate, according to one or more embodiments.
Figure 2E:
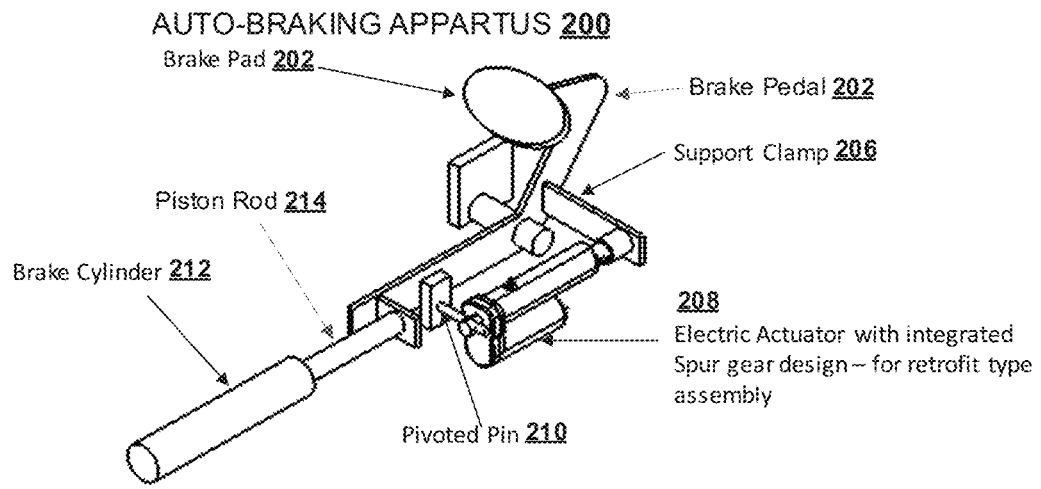
FIG. 2E is an isometric view depicting apparatus for auto-braking mechanism, according to one or more embodiments.
Figure 2F:
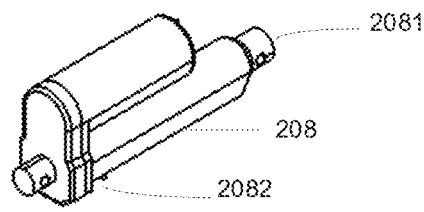
FIG. 2F is an isometric view depicting electric actuator of apparatus for auto-braking mechanism, according to one or more embodiments.
Figure 2G:
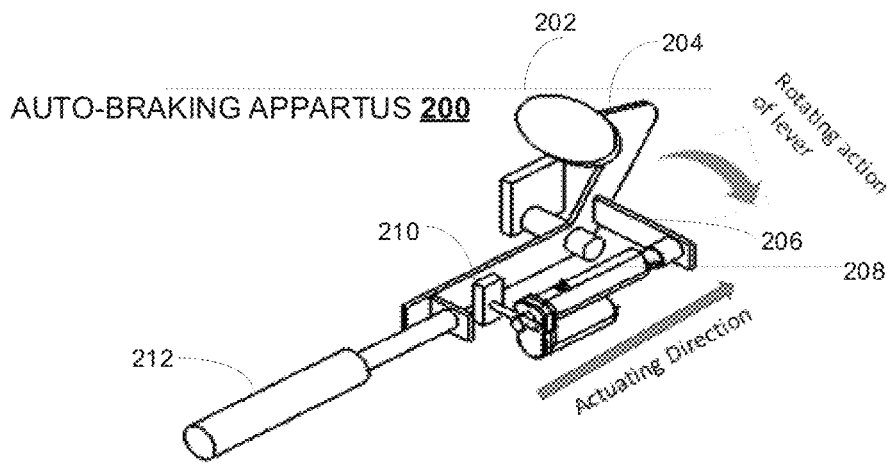
FIG. 2G is an isometric view depicting actuation direction and direction of rotating action of lever of apparatus for auto-braking mechanism, according to one or more embodiments.

FIG. 2C is a left perspective view depicting apparatus for auto-braking mechanism, according to one or more embodiments. FIG. 2D is an isometric view depicting apparatus for auto-braking mechanism with foot resting plate, according to one or more embodiments. FIG. 2E is an isometric view depicting apparatus for auto-braking mechanism, according to one or more embodiments. FIG. 2F is an isometric view depicting electric actuator of apparatus for auto-braking mechanism, according to one or more embodiments. FIG. 2G is an isometric view depicting actuation direction and direction of rotating action of lever of apparatus for auto-braking mechanism, according to one or more embodiments.

In one or more embodiments, the apparatus for auto-braking mechanism, which may be retro fitted to an electric vehicle may comprise, but not limited to a brake pad 202, a brake pedal 204, a support clamp 206, an electric actuator 208, a pivot pin 210, a brake cylinder 212, a brake piston 214 and a foot resting plate 216. The brake pad 202 may be physically coupled to the brake pedal 204 which may be in turn connected to the brake cylinder 212 through brake piston 214. One end (2061) of the support clamp 206 may be physically coupled to the brake pedal 204 and another end (2062) may be physically coupled to one end (2081) of the electric actuator 208. Another end (2082) of the electric actuator 208 may be pivoted to the brake piston 214 which is in turn connected to brake cylinder 212. In another embodiment, the another end (2082) of the electric actuator 208 may be physically coupled to an edge of the brake pedal 204 physically coupled to brake piston 214, using a pivot pin 210. The electric actuator 208 may be configured to receive one or more electric signals from a motor controller which is a part of integrated auto-steering and auto-braking system.

The electric actuator 208 may comprise an integrated gear box mechanism and may be assembled with a support clamp 206 to actuate the brake cylinder 212. The electric actuator 208 may be operatively coupled with a programmable logic controller. The electric actuator 208 may be pivoted at a rear end (second end 2082) and a forward end (first end 2081) may be physically coupled to the brake pedal 204 (also referred as 'break lever'). When the electric actuator 208 is actuated, the reciprocating end connected to brake lever, may push the brake lever (say, in a first direction) and the brake may get engaged. When the electric actuator 208 is released, the brake lever may be moved in a direction opposite to the first direction, causing the brake of the electric vehicle to disengage. Based on a controlled voltage through the programmable logic controller, the electric actuator 208 may be configured to engage brake to a required movement of brake lever in order to achieve controlled movement of the electric vehicle.

The disclosed auto-braking mechanism may ensure possibility of both manual braking during emergency situations and also a programmatically controllable auto-braking mechanism. The auto-braking mechanism can be retro fitted to make the braking system completely automatic. The auto-braking system may be controlled through programmable logic controller for instant/gradual braking based on distance of one or more obstacles from the electric vehicle. Advantage of the disclosed auto-braking mechanism is that the system may be concealed beneath the electric vehicle and driver area in the cabin is not disturbed. The complete system has fewer number of components and fits as simple assembly to make the braking automatic.

Figure 3C:
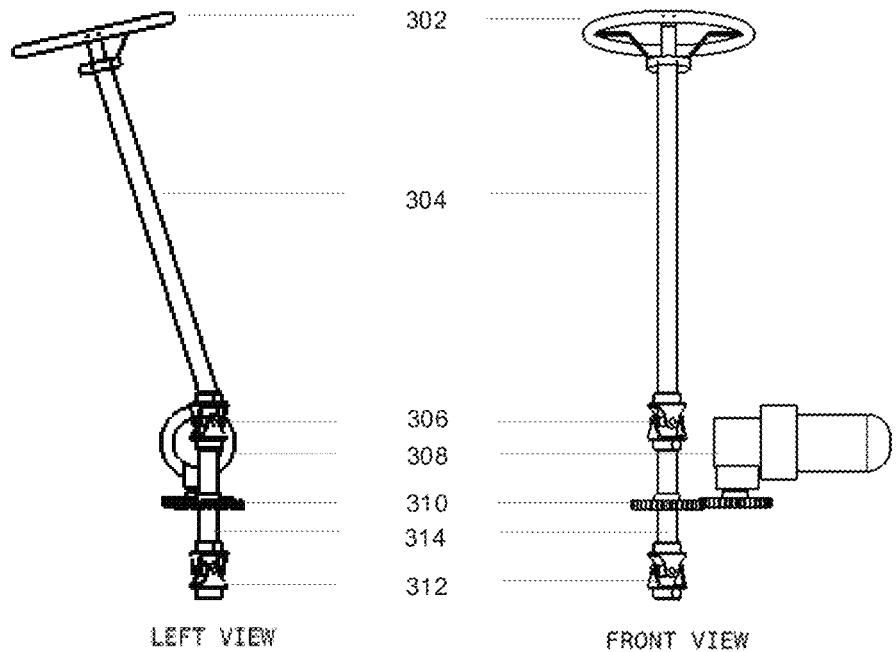
FIG. 3C is a top perspective view depicting apparatus for auto-steering mechanism, according to one or more embodiments.
Figure 3C:
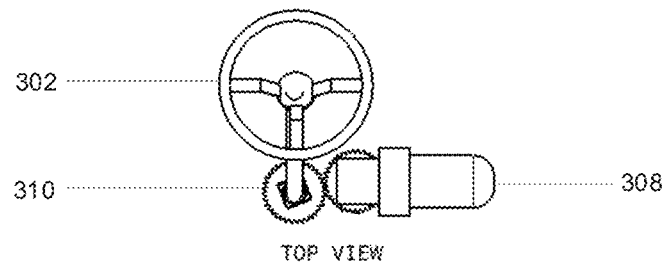
Figure 3D:
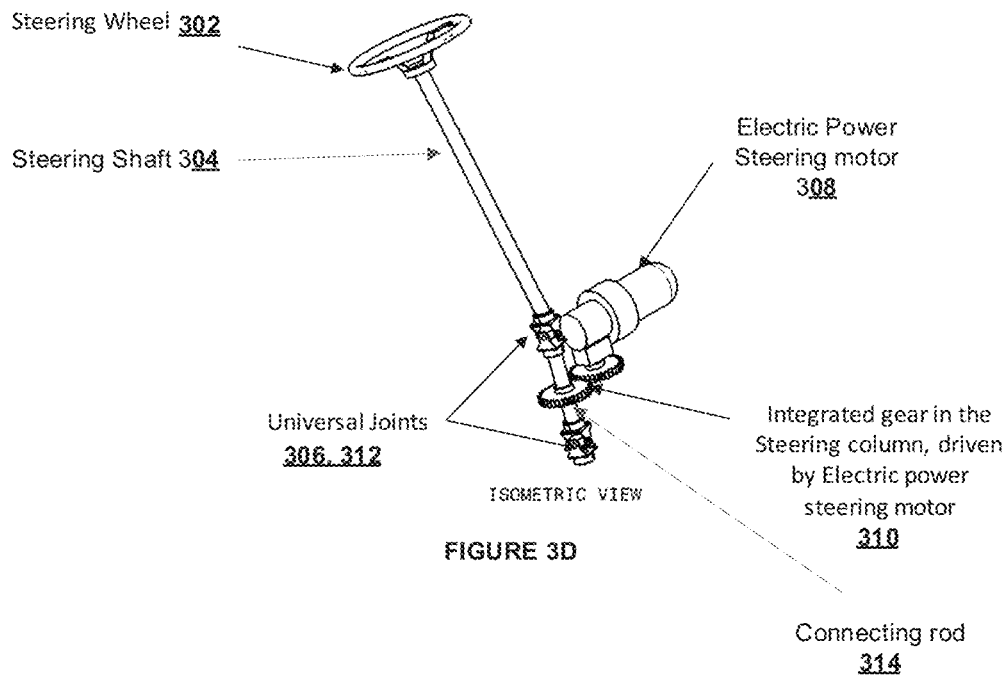
FIG. 3D is an isometric view depicting apparatus for auto-steering mechanism, according to one or more embodiments.
Figure 3E:
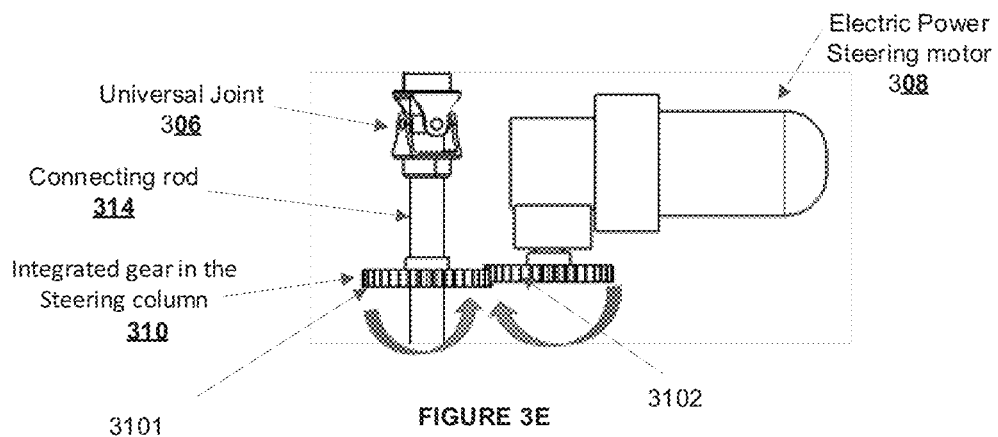
FIG. 3E is a front view depicting integrated spur gear in the steering column along with electric power steering motor of the apparatus for auto-steering mechanism, according to one or more embodiments.

FIG. 3A is a left perspective view depicting apparatus for auto-steering mechanism, according to one or more embodiments. FIG. 3B is a front perspective view depicting apparatus for auto-steering mechanism, according to one or more embodiments. FIG. 3C is a top perspective view depicting apparatus for auto-steering mechanism, according to one or more embodiments. FIG. 3D is an isometric view depicting apparatus for auto-steering mechanism, according to one or more embodiments. FIG. 3E is a front view depicting integrated gear in the steering column along with electric power steering motor of the apparatus for auto-steering mechanism, according to one or more embodiments.

In one or more embodiments, an apparatus for auto-steering mechanism may comprise, but not limited to, a steering wheel 302, a steering shaft 304, a pair of universal joints (universal joint 306 and universal joint 312), an Electric Power Steering (EPS) motor 308 and a chain of integrated spur gear 310. The steering wheel 302 is physically coupled to steering shaft 304 (also called 'steering column'). A connecting rod (314) generally observed in vehicles which connects the steering shaft 304 and tie rod end (not shown in figure) may be replaced by a component of the auto-steering mechanism comprising a spur gear (3101), with a pair of universal joins (306 and 312) as illustrated in FIG. 3A. The spur gear (3101) may be operative coupled to another spur gear (3102) which is in turn operatively coupled to the EPS motor 308. Both the spur gears may form a chain of integrated spur gear 310. The integrated spur gear 310 may enable the steering wheel 302 to rotate in a required direction by operating the EPS motor 208. The auto-steering mechanism may be achieved by controlling the direction of rotation of the steering wheel 302 through algorithms and set of hardware and software components. The EPS motor 308 may be configured to receive electric signal(s) from a programmable logic controller. The integrated spur gear 310 can be directly mounted under the steering shaft 304.

In one or more embodiments, the EPS motor 308 may be placed inside bonnet of a vehicle. The EPS motor 308 may be held firmly by means of a strong structure and/or one or more bolts. One end of the EPS motor 308 may be fixed with a gear wheel (3102). Another gear wheel (3101) may be fixed firmly on the rod connected to steering shaft 304 through pair of universal joints 306 and 312 which may be operatively coupled with the gear wheel operatively fixed to the EPS motor 308. When the EPS motor 308 is turned on (i.e., one of more signals are passed to the EPS motor 308), the gear connected to EPS motor 308 may rotate and this rotating action of the EPS motor gear may drive the gear connected to the steering shaft 304 and may lead to rotation of the steering wheel 302, thereby rotation of vehicle is ensured.

In one or more embodiments, the spur gear (3101) of the steering shaft 304 may be attached in a way to rotate in a direction opposite to the direction of the rotation of the spur gear (3102) attached to the EPS motor 308. For example, from a perspective of a driver of vehicle, if the spur gear (3102) attached to the EPS motor 308 rotates in a clockwise direction, the spur gear (3101) attached to the steering shaft (304) may rotate in an anti-clockwise direction, causing the vehicle to turn towards left of the direction of movement the vehicle. Similarly, from a perspective of a driver of vehicle, if the spur gear (3102) attached to the EPS motor 308 rotates in an anti-clock-wise direction, the spur gear (3101) attached to the steering shaft (304) may rotate in a clockwise direction, casing the vehicle to turn towards right of the direction of movement of the vehicle.

The integrated spur gear 310 and the auto-steering mechanism is not limited to the working as mentioned above. The rotational direction of both the spur gears (spur gear of the steering shaft 304 and spur gear of the electric power steering motor 310) may also be same and may be achieved by adding/removing one or more spur gears to the integrated spur gear 310. The integrated spur gear 310 in the steering shaft 304, which can be easily replaced in any vehicle enables retro fitment to make completely automatic with the associated EPS motor 308.

In one or more embodiments, an angular encoder (also referred as 'steering angle sensor' or 'sensor') may be coupled to apparatus for auto-steering, which may measure angle of the steering wheel 302 at a given time, which may enable the precise rotational movement with high level of accuracy for precise navigation. The complete design is simple spur gear design with integrated drive train coupled with the EPS motor 308. The complete system may be concealed beneath the vehicle and driver area in the cabin may remain undisturbed. The complete system will have fewer number of components and fits as a simple assembly to achieve automatic steering.

In one or more embodiments, a stepper motor may be used as Electric Power Steering (EPS) motor. To achieve auto-steering mechanism, angular position of the steering wheel 302 obtained using the angular encoder may be mapped to number of steps of rotation required in the stepper motor. One or more positional values of the steering wheel obtained from the stepper motor may be mapped to speed at which a driver can turn the vehicle. Torsional load from the steering column measured using a torque sensor may also be mapped to torque delivered from the stepper motor. Further, in an example embodiment, a trapezoidal acceleration method may be used to move the gear train—initial acceleration goes in linear path with respect to time till the gear train achieves the desired speed & then the acceleration remains constant for the rest of time and further again the deceleration goes in linear path with respect to time till the gear train achieves rest.

In one or more embodiments, a gear train may be used to achieve auto-steering mechanism. One or more parameters may be considered while selecting/designing the gear train to achieve auto-steering mechanism, but not limited to material that the gear train is made of, pressure angle of the gear train, frictional torque, Factor of Safety (FOS), positioning and load carrying capacity of vehicle. As per the American Gear Manufacturers Association (AGMA), the spur gears are manufactured in multiple variants in terms of pressure angle—14.5-degree and 20-degree pressure angle, both having their own merits and demerits, especially on the tangential tooth load carried by the gear train. More the pressure angle value, more the load carrying capacity.

In an example embodiment, a spur gear with twenty (20) degree pressure angle may be considered for building the auto-steering mechanism. The speed of the gear train may be reduced to get higher torque value. If there is no good amount of gear ratio, bulky motor may be required to achieve a required effect and also the amount of power required from battery would also be high (in case of electric vehicles), which may not be feasible to make the system retro-fit. Hence speed of the gear train may be reduced to get the higher torque value. Generally, the speed is reduced by, in the range of 65%-85%. The Frictional torque could be high due to wheels and road surface. The torque requirement for steering wheel rotation depends on the surface roughness of the road. Higher the roughness of road, higher torque required for wheel rotation. Speed reduction of vehicle may also be considered, to leverage and optimize the torque requirement. The required torque is directly proportional to the speed, so the system needs to optimize the speed to reach achievable optimal torque. Factor of Safety (FOS) may be optimized at 3.56. The Factor of Safety may be optimized based on the load on teeth followed by permissible stress values of the material. The material of the gear train which may be simple gear train made of metal. The positioning and load carrying capacity may be analyzed for effective steering. The positioning methods may be defined based on, but not limited to the material, rigidity and homogenous structural elements, pressure angle and/or profile of the gear tooth.

In one or more embodiments, sensor(s) may also be integrated with EPS motor (308) operated by a Drive-By-Wire system. Steering motion may be controlled through EPS motor (308) to ensure proper turning radius of the steering wheel 302. The mechanism may be structured with simple supported architecture(s).

In one or more embodiments, one or more components of auto-steering and auto-braking such as, but not limited to, a gear box, a spring and/or a Brushless DC motor (BLDC) motor, may pass through multiple stages of design and development such as Ideation and Mapping, Architect and Engineering, Test and Validation, and Proto and Manufacture Engineering for product development. Each of the multiple stages demand certain activity and parameters to be considered to fetch effective results.

In one or more embodiments, for the design of gear box, at the Ideation and Mapping stage, one or more parameters may be considered such as, but not limited to a tangential load (Ft), a gear ratio, profile (cycloidal or involute) and torque assessment, and/or dynamic and wear load. The tangential load (Ft) is important to calculate power required for the vehicle to move. As explained in earlier paragraphs, the gear ratio also plays a crucial role as improper gear ratio may lead to bulkiness of the motor which may defeat the intention of the present disclosure to make the system retro-fit.

Gears may have two types of profile—cycloidal profile and involute profile. Each type of profile will have different advantages compared to other. In an example embodiment of the present disclosure, gears of involute profile may be used to achieve auto-steering mechanism. The dynamic load and wear load are the design intents which may be considered during the ideation and mapping stage as the gears may go through multiple rotation with multiple load variation based on the uphill or downhill movement that vehicle will experience. Hence, dynamic load factor and wear load factor of the gears may be considered before moving to the Architect and Engineering stage.

In one or more embodiments, at the Architect and Engineering stage of the gear box, one or more parameters, such as, but not limited to, gear tooth width (load carrying element), gear position, rib analysis, and lubrication and bearing may be considered. The gear position plays a vital role in terms of avoiding the backlash. In order to avoid the backlash, instead of pin mounting, the gears may be directly mounted on to the steering column as an integrated component. The rib analysis may be performed to reduce stress on the gear drive and helps in deciding lubrication and bearing for the gear train mechanism before moving on to the Test and Validation stage.

In one or more embodiments, at the Test and Validation stage of the gear box, various tests and assessment such as, but not limited to wear analysis with Accelerated Life Testing (ALT), variable load test, lubrication validation, and precise motion control analysis may be performed, which may be a continuous exercise.

In one or more embodiments, at the Proto and Manufacture engineering stage of the gear box, one or more parameters, such as, but not limited to standardization, migration to snap joints to avoid screws wherever possible, secondary process cost out and self-lubricating materials may be considered. The secondary process cost out may be considered for checking possibilities of eliminating secondary manufacturing processes such as Heat treatment/coating with the use of better primary manufacturing process or by use of self-lubricating material. After arriving at specific values and dimensions in the previous stages, for example the Factor of Safety (FOS) is may be decided to be 3.5 and the number of teeth in the gear may be 20. But in the market, the available gear is of the 24 teeth and FOS is 4, few optimizations may be carried out in terms of spin reduction to achieve standardization. Self-lubricating material such as grease is used in case of metal gear train.

In one or more embodiments, for the design of spring, at the Ideation and Mapping stage, one or more parameters, such as, but not limited to stiffness, response time, number of turns, and wire diameter and torsional may be considered, At the Architect and Engineering stage, one or more parameters, such as, but not limited to type-fit-operation, resonance and reliability, transient load, and response and stiffness may be considered. At the Test and Validation stage, one or more tests and assessments such as, but not limited to response time test, fatigue test, reliability of actuation assessment, wear at nodal points tests may be performed. At the Manufacture and Engineering stage, one or more parameters, such as, but not limited to standardization, commercial off-the-shelf (COTS) items, secondary process cost out and damping assessment may be considered.

In one or more embodiments, for the design of BLDC motor, at the Ideation and mapping stage, one or more parameters, such as, but not limited to mechanical inertia, holding torque, instantaneous torque, Lorentz force and detent torque may be considered. At the Architect and Engineering stage, one or more parameters, such as, but not limited to voltage-current, power assessment, acceleration curve and motor response time may be considered. At the Test and Validation stage, one or more tests as assessments may be performed such as, but not limited to rotation per minute (RPM) and torque assessment, precision and accuracy determination, back Electro motive force (EMF) & Economic Value Added (EVA) analysis and demagnetization effect may be assessed. At the Manufacture and Engineering stage, one or more parameters such as, but not limited to BLDC motor alternative, standardization or COTS (Components Off the Shelf), damping torque assessment and response time may be considered.

Figure 4:
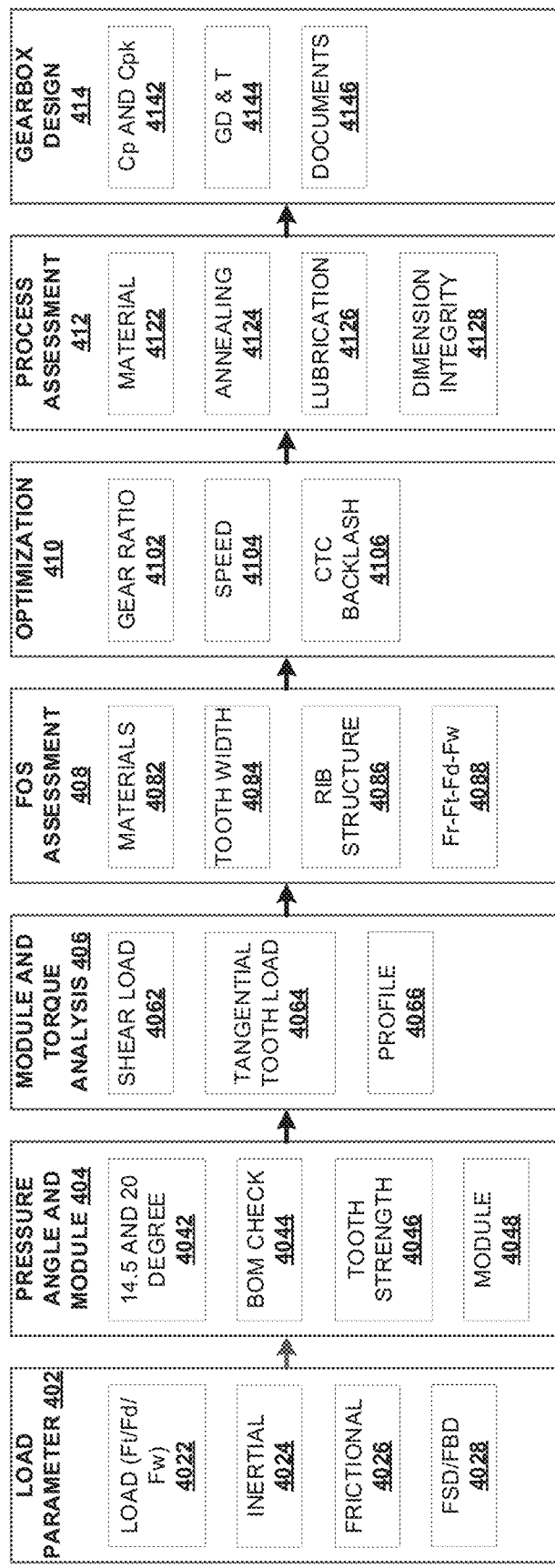
FIG. 4 is a process flow diagram illustrating steps in designing gear for auto-steering mechanism, according to one or more embodiments.

FIG. 4 is a process flow diagram illustrating steps in designing gear for auto-steering mechanism, according to one or more embodiments. The process may start with considering different load parameters (402) such as tangential load (Ft) 4022, dynamic load (Fd) 4022, and Wear load (Fw) 4022 which is important for gear design. The tangential load (Ft) 4022 may be a primary load considered for deciding the gear width The dynamic load (Fd) 4022 comes into picture when the vehicle is in motion with the load. The Wear load (Fw) 4022 may be experienced when the vehicle is in motion continuously on a given surface. The second element may be inherent inertial load 4024 of the gear system which in itself will have some mass/load. Third element under the load parameters may be a frictional load (4026). A vehicle cannot be set in motion unless there is a thrust. Till the time the external load is applied to overcome the inertia, the frictional force holds the vehicle in a fixed position. Frictional force can be overcome using external force, through a battery. So, the frictional force or friction load 4026 may help in deciding what power is required from battery to set vehicle in motion. Force Stress Diagram (FSD) and Free Body Diagram (FBD) 4028 may also be considered as computational diagrams for assessing design integrity through theoretical calculations and applying standard formulas. A Free Body Diagram (force diagram, or FBD) is a graphical illustration used to visualize the applied forces, movements, and resulting reactions on a body in a given condition. For example, in case of gear, it may not be possible to consider all the teeth, instead a line diagram can be made with illustration of pointed load. A Force Stress Diagram (FSD) illustrates the position—where exactly the tangential tooth load is going to act on, and/or the type of stress—tensile, compressive or shear stress. Pressure angle and module parameters may be considered at the next stage, such as, but not limited to pressure angles of 14.5 degree and 20 degrees, BOM (Bill of Material) check 4044, tooth strength 4046 which defines load carrying capacity of a given tooth in a gear, and/or a module 4048 which indicates how big or small the gear is, which is expressed as ratio of diameter with respect to number of teeth in the gear. Typically, the value of module 4048 varies between 0.5 millimeter (mm) to 1 millimeter (mm) depending on the type of gear is used.

After the decision is made on pressure angle and module 404, and the type of load 402, module and torque analysis 406 may be performed by considering parameters such as, but not limited to shear load 4062, tangential tooth load ability 4064, and the profile 4066 of the gear. The gear should have sufficient shear load 4062 as the load should not shave off the teeth of gear and the gear should hold the teeth intact. The profile 4066 of the gear may also be considered, which can be at least one of cycloidal profile and/or involute profile. After determining the torque as mentioned in module and torque analysis 406, through one or more design aspects of gear, the material requirement analysis may be performed. An FOS assessment 408 may be performed based on, but not limited to, material used for the gear 4082, tooth width 4084, rib structure 4086 and also by considering loads 4088 such as dynamic load (Fd), tangential load (Ft), wear load (Fw) and radial load (Fr). The material used for the gear 4082 may be at least one of, but not limited to plastic, cast iron, steel, and polyacetal. Based on the material used 4082, the tooth width 4084 and the rib structure 4086 may be decided. Most of the time the gear would be mounted on a circular shaft. The circular shaft would experience a torsional load through the radial load. Force acted around the radius of a shaft may be considered after deciding the tooth width 4084 and the rib structure 4086. Always, the Factor of Safety (FOS) should be more than 1. As per AGMA standards, the FOS assessment 408 should be 4. More the FOS assessment value, bulkier the gear system. The FOS may be optimized to make the system retro-fit. At the optimization stage, CTC (centre-to-centre) backlash may be reduced by determining center-to-center distance between the two gear drives. Also, the gear ratio based on the optimization may be determined and speed required for the gear drive may also be analyzed. At the process assessment stage 412, after deciding the material of the gear 4122, annealing process 4124 may be carried out. Annealing is a heat treatment process used mostly to increase the ductility and reduce the hardness of a material. Dimensional integrity 4128 i.e., all the critical dimensional aspects required for the motion may also be ensured for the proper functionality that the gear would hold, along with material 4122 and lubrication analysis 4126 which could be grease or any self-lubricating material. Dimensional integrity 4128 may also be analyzed. At the stage of Gear box design 414, process capability (Cp) and process capability index (Cpk) 4142 may be calculated, Geometric Dimensioning and Tolerancing (GD&T) 4144 and documentation 4146 may be carried out. Cpk is a statistical tool, to measure the ability of a process to produce output within specification limits.

Figure 5:
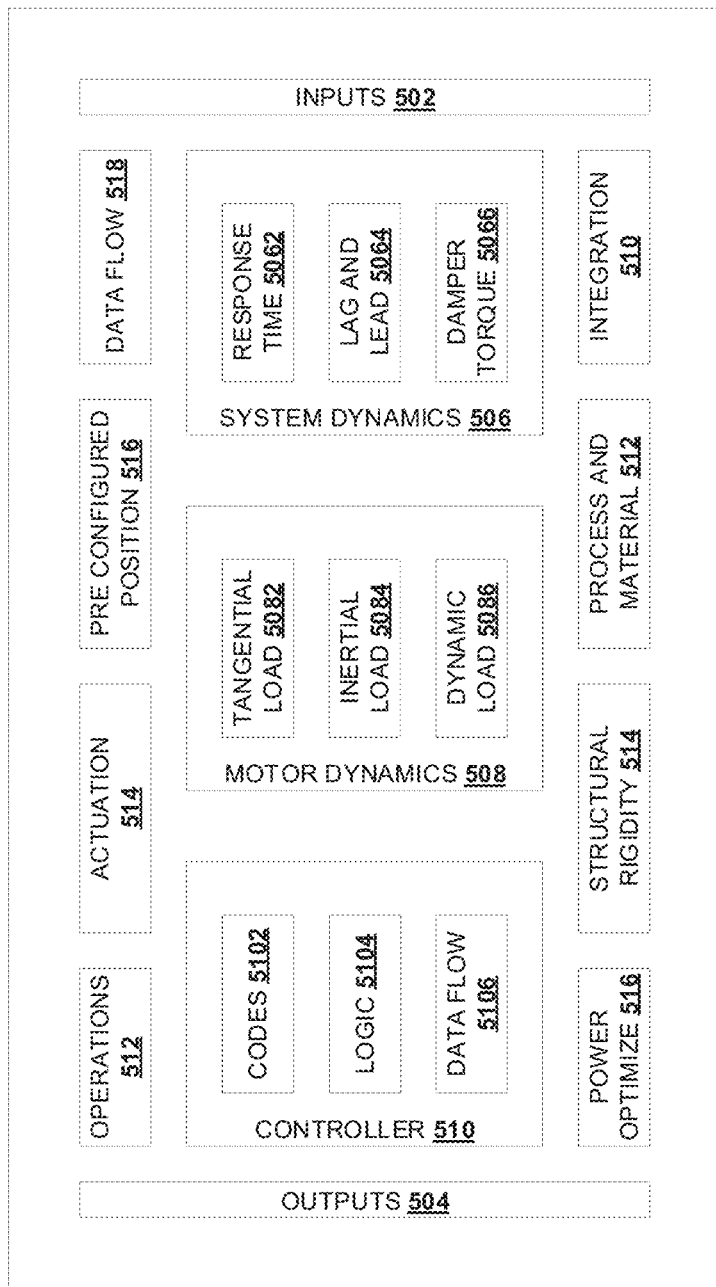
FIG. 5 is a block diagram illustrating design details of integration of gear box with controller for auto-steering mechanism, according to one or more embodiments.

FIG. 5 is a block diagram illustrating design details of integration of gear box with controller for auto-steering mechanism, according to one or more embodiments. Assume a movement of a gear drive for certain rotational angle. There are possibilities that the gear drive may move below the required angle or above a required angle for various reasons. To ensure that the system is responsive and accuracy is achieved, the electronic systems come into picture. The gear box and electronic systems (for ex. a programmable logic controller or simply 'controller') need to go hand in hand to ensure responsiveness. The controller may be configured to send one or more electric signals to motor associated with gear drive, to operate the gear drive in required manner to achieve auto-steering mechanism. The block diagram in FIG. 5 illustrates how one or more inputs 502 may be considered and interaction between various components such as motor and controller to obtain desired outputs 504. The one or more inputs may be, but not limited to required number of steps in the motor, voltage, current, and sequences—in terms of forward or backward rotation of motor. The outputs 504 may be a torque required for actuation, moment, rotation and required control signal for proper functionality. System dynamics 506 may comprise one or more parameters such as, but not limited to response time 5062, lag and lead values 5064 and/or damper torque 5066 may be considered. A lag is the delay due to dynamic frictions and timing of internal components operated through controller and lead is the advancement or early response due to wear and tear, and/or ageing of electronic components. Assume in a vehicle, brake is applied and the throttle pedal is released. The gear drives would still be running but the vehicle will not move. It is because of damper torque and backlash between gears, wherein the vehicle would require external force to overcome these inertial force.

Motor dynamics 508 may comprise, but not limited to, tangential load 5082, inertial load 5084, and/or dynamic load 5086. A motor may experience one or more such loads mentioned above, which may define the torque in motor such as pull out torque, pull in torque and/or detain torque, and may be analyzed to determine whether these are good enough to take care of the gear box. Controller 510 may be programmed through lines of code 5102, written in programming language such as, but not limited to Robotic Operating System (ROS) implemented using C++, Python, Tensorflow, OpenCV, and/or PLC programming languages. One or more logics 5104 may also be defined through codes 5102, for example, move 'n' steps forward or move 'm' steps backward (where n and m may be number of steps), receive feedback from sensors and perform one or more actions. The one or more logics 5104 may also define, by how many rotations the gear to be rotated to achieve required angle of rotation of steering. For example, consider the vehicle needs to take right turn, the steering angle to be moved right by 20 degrees. The degrees would be translated to number of rotation of the gear, which in turn will calculate the number of rotation considering various parameters such as gear ratio. Data flow 5106 may be digital and/or analog.

In one or more embodiments, the integration of gear box and controller may comprise, one or more activities such as, but not limited to one or more operations of the gear box 512, gear actuation 514 causing rotation of gear, pre-configured/pre-defined positions 516 with respect to rotation of gear as per the controller signal, data flow 518 i.e. the communication from controller to the motor driver to enable gear motion, integration 510 i.e. a closed loop system to interact with controller, motor driver, application and mechanical sub-systems including encoder, process and material 512 related to reliability and performance tests for its intended life, structural rigidity 514 to withstand static & dynamic loads during gear train operations 512, and/or power optimization 516.

In one or more embodiments, to achieve effective motion in auto-steering and auto-braking mechanism, one or more parameters may be considered and evaluated such as, but not limited to, inertia, load, leakages, response, friction, bearing, lubrication, mechanism, static-dynamic variables, and/or fail safe analysis. In terms of position, system/apparatus may be evaluated based on one or more parameters, such as, but not limited to precise, accuracy, repeatability, end limiters, orientation, zone of actuation, load transmission, detent, holding, and pull-out and/or pull-in torque. In terms of performance, system/apparatus may be evaluated based on one or more parameters such as, but not limited to response time, efficiency, leakages, fail safe, movement path, optimization, load, position, torque, power, actuation, and/or output characteristics.

Figure 6:
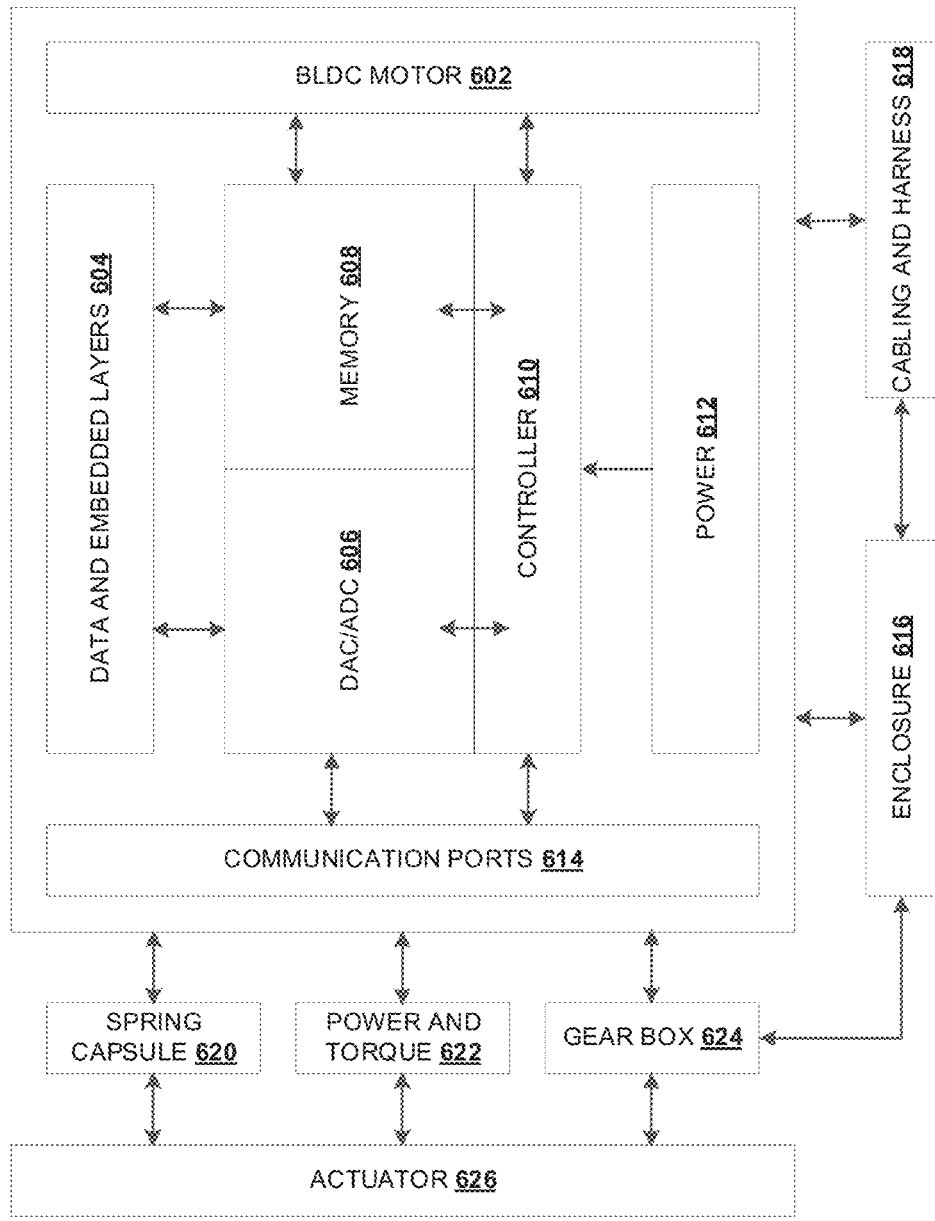
FIG. 6 is an operational notation diagram illustrating various modules involved in the auto-braking mechanism, according to one or more embodiments.

FIG. 6 is an operational notation diagram (OND) illustrating various system components involved in the auto-braking mechanism, according to one or more embodiments. The FIG. 6 primarily illustrates an actuator 626 created for the auto-braking system and plurality of components associated with the actuator 626. In one or more embodiments, the auto-braking system may comprise, a brushless DC (BLDC) motor 602 operatively coupled with controller 610 (also referred as Programmable Logic Controller), a memory device 608 (computer readable storage medium), Digital-to-Analog (DAC) converter 606, Analog-to-Digital (ADC) 606 converter for signal conversion, data and embedded layers 604 comprising the analog and digital intercommunication protocols to work with appropriate application programmable interfacing commands to communicate with the controller 610. The memory device 608 may be configured to store the required registry of macros that are written to sequentially execute & memorize the data positions for repeatability. All the electronic components may be supported by an electrical power 612. The controller 610, the DAC/ADC 606 and the memory device 608 may be connected via one or more cables to plurality of mechanical components of the system through one or more commination ports 614. The one or more communication ports 614 may be, at least one of, but not limited to Universal Serial Bus (USB), Ethernet and/or Optical Fiber Cable (OFC). The communication ports 614 through cables are in turn connected to the actuator 626 through gearbox 624, power and torque operations 622, and spring capsule 620. All the system components are enclosed with an enclosure 616 and cabling and harness 618 which may be at least one of straight cabling and/or twisted cabling.

In one or more embodiments, the DAC/ADC 614 may be required as the controller 610 is capable of processing digital signals. One or more sensors may understand analog signal. Hence, for the communication between components of different signal capability, DAC/ADC 614 maybe required. IP compliance of the enclosure 616 may also be checked. IP (Ingress Protection) rating is used to define levels of sealing effectiveness of electrical enclosures against intrusion from foreign bodies (tools, dirt etc.) and moisture.

Till now, the disclosure describes the mechanical aspects of the system and the integration of mechanical components of the system with electrical components and then the embedded firmware. The subsequent paragraphs describe the overall integration of auto-steering, auto-braking and auto-acceleration mechanism resulting in a Drive-By-Wire system and the working of the Drive-By-Wire system.

Figure 7:
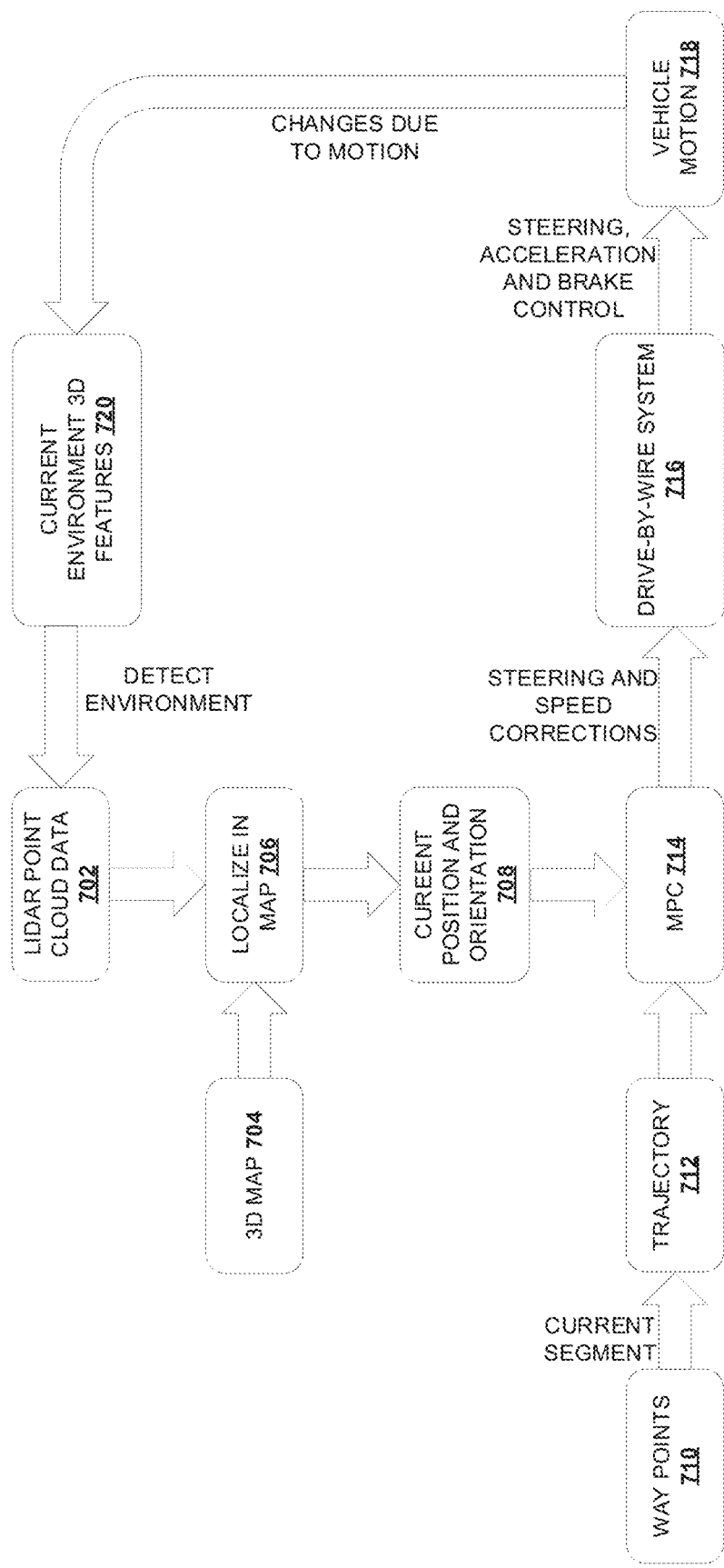
FIG. 7 is an architecture diagram illustrating automated driving control loop of Drive-By-Wire system, according to one or more embodiments.

FIG. 7 is an architecture diagram illustrating automated driving control loop of Drive-By-Wire system, according to one or more embodiments. In one or more embodiments, integrated system may comprise one or more electrical components, mechanical component and embedded components. All the mentioned components should act and interact in synchronized manner and may be achieved through a computer application. The architecture diagram in FIG. 7 illustrates enablement of auto-steering, auto-braking, auto-acceleration mechanism disclosed in earlier paragraphs. For example, how the Drive-By-Wire systems will understand when to rotate left, when to rotate right, when not to rotate, if to be rotated—what is the degree of rotation etc., these questions are addressed by automated driving control loop. As illustrated in the FIG. 7 the automated driving loop comprises of LIDAR (Light Detection and Ranging) sensor which may generate Point Cloud Data (PCD) 702 comprising millions of 3D points representing the environment around the vehicle. A virtual environment (3D map) 704 may be created using the Point Cloud Data 702 by connecting the various points in the Point Cloud Data 702, which represents various object around the vehicle. The 3D map may be created using third party tools such as, but not limited to, Autoware and/or OpenCV. Once the Point Cloud Data 702 is ready, the auto-driving loop may determine the position (current location) and orientation 708 of the vehicle with respect to the 3D map, referred to as localization in map 706. A set of way points 710 may be determined, i.e. the source and destination in the 3D map. The set of way points may be determined dynamically based on the density of Point Cloud Data 702 and other requirement of a user. The set of way points may be picked up indicating the source and destination in the map. A trajectory 712 may be drawn connecting the points, wherein the trajectory may be a straight line or curved line depending on the free space between the points. Model Predictive Controller (MPC) 714 program may be used to ensure that the vehicle traverses along the defined trajectory. Based on the output of the MPC 714, one or more instructions may be sent to the auto-driving apparatus to correct the vehicle if it is determined to be not in line with the trajectory 712. For example, consider a scenario in which the vehicle has deviated 10 degrees from a designated trajectory. Using the Point Cloud Data 702 and the 3D Map 704, the localization output 706 detects this deviation and a steering and speed correction signals are issued by the MPC 714 to Drive-By-Wire system 716. The steering and speed correction signals may comprise of a steering angle change in a direction that reduces the deviation from the trajectory and to set the vehicle in motion 718 in a defined trajectory. In addition, the acceleration and braking may also be either engaged or disengaged depending on the desired speed and trajectory characteristics. Any changes in the motion of the vehicle may be determined through one or more sensors associated with the vehicle or the system, and current environment 3D features 720 are analyzed along with PCD 702. This is a continuous process, and comparisons are made for each and every Point Cloud Data 702 with the 3D map 704 at the desired/pre-defined time interval (say, nano seconds) and may keep the vehicle moving in the defined trajectory 712.

Figure 8:
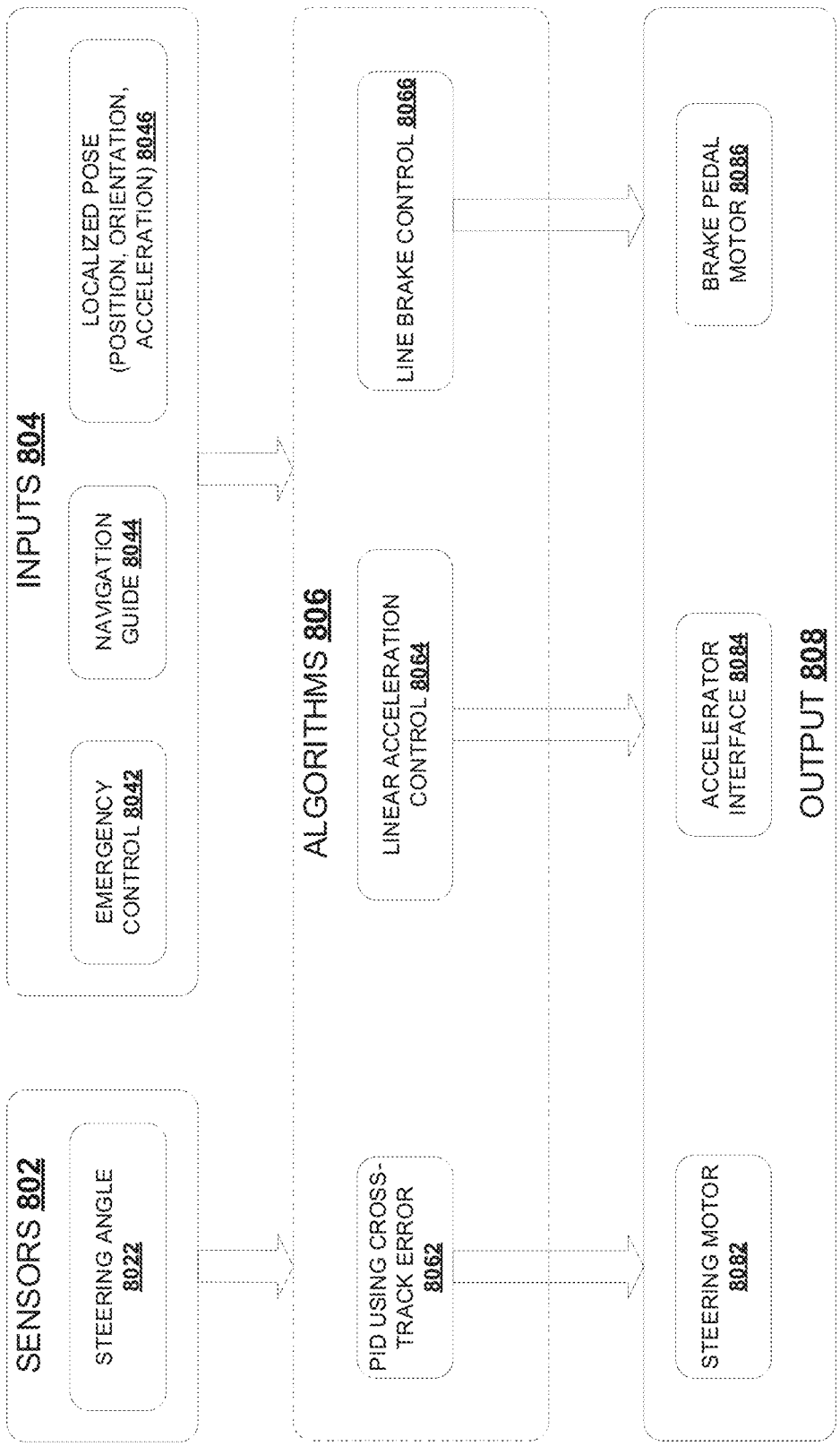
FIG. 8 is a block diagram illustrating Drive-By-Wire system for auto-steering auto-braking and auto-acceleration mechanism, according to one or more embodiments.

FIG. 8 is a block diagram illustrating a Drive-By-Wire system for auto-steering, auto-braking and auto-acceleration mechanism, according to one or more embodiments. In one or more embodiments, the system may comprise one or more sensors 802, one or more inputs 804 in terms of emergency control signal 8042, navigation guide 8044, and localized pose 8046 i.e. position, orientation and acceleration data of vehicle. The system may also comprise one or more algorithms 806, implemented to determine one or more cross-track errors 8062 through a PID controller. The cross track errors 8062 may be a deviation of the autonomous vehicle from a defined trajectory due to various external reasons such as obstacles, rough/non-flat terrain etc. A PID (Proportional Integral Derivative) controller is an instrument used in industrial control applications to regulate temperature, flow, pressure, speed and other process variables. PID controllers may use a control loop feedback mechanism to control process variables. One or more algorithms may also be used for linear acceleration control 8064 and linear brake control 8066 of the vehicle through one or more components as described in the present disclosure. The output 808 from the cross-track error 8062 from PID controller may be sent to Electric Power Steering motor 8082 associated with auto-steering mechanism, output from linear acceleration control may be sent to accelerator interface 8084 associated with auto-acceleration mechanism, and output from linear brake control 8066 may be sent to brake pedal motor 8086 associated with auto-braking mechanism to achieve desired output 808. The desired output 808 may be at least one of, rotation of steering wheel, either of engaging or disengaging of brake of the vehicle and/or either acceleration or deceleration of the vehicle. In one or more embodiments, the value of acceleration commanded for the auto-acceleration mechanism is logically controlled by various inputs including, but not limited to, the path planning, vehicle location, vehicle orientation, current acceleration, emergency inputs, and obstacles as represented in FIG. 8.

Figure 9:
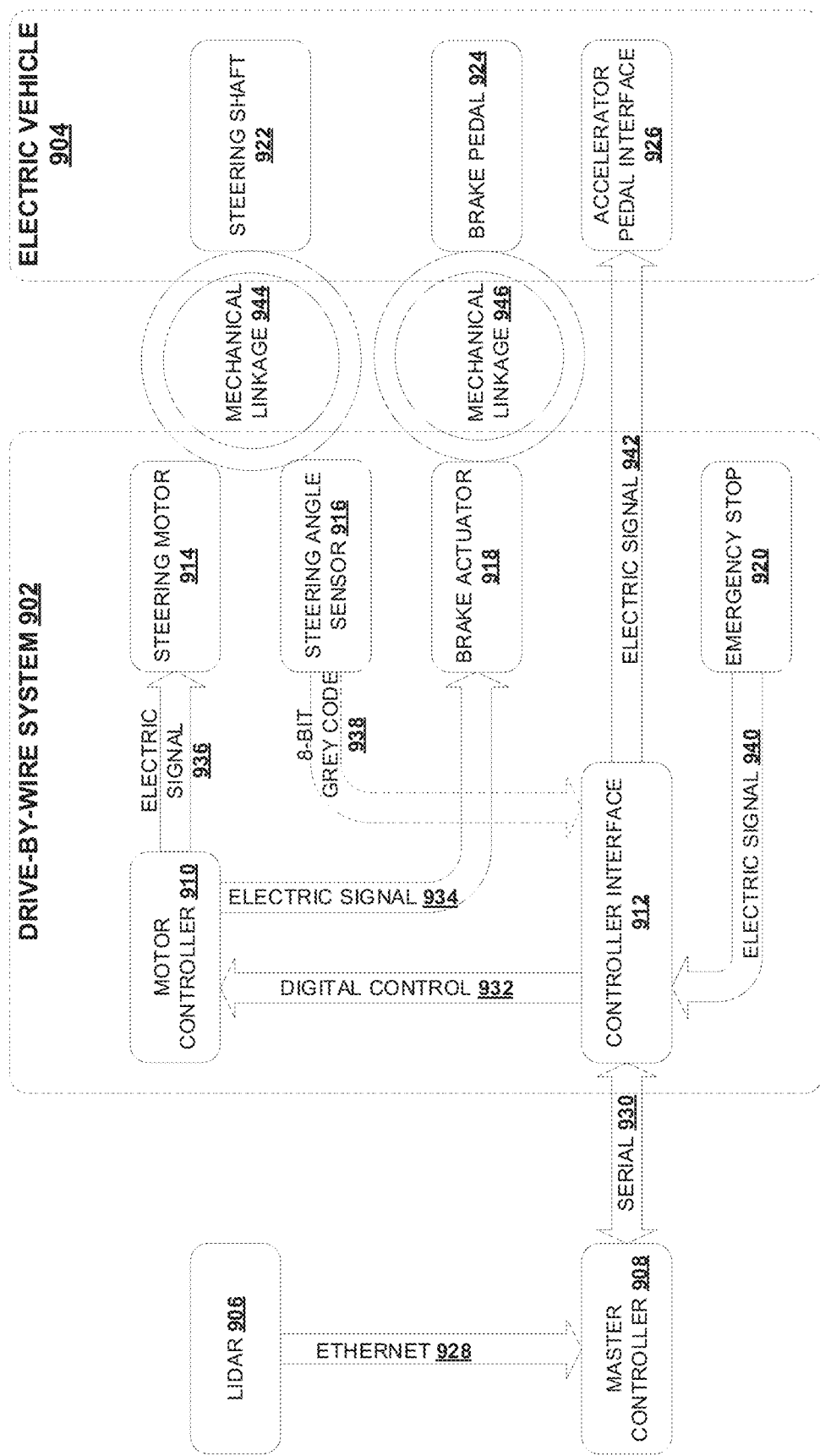
FIG. 9 is a hardware architecture diagram illustrating various components and communication between the components of the integrated system for auto-steering, auto-braking and auto-acceleration mechanism, according to one or more embodiments.

FIG. 9 is a hardware architecture diagram illustrating various components and communication between the components of the integrated system for auto-steering, auto-braking and auto-acceleration mechanism (or simply 'integrated system'), according to one or more embodiments. In one or more embodiments, the integrated system may comprise one or more components, but not limited to a Drive-By-Wire System 902, an electric vehicle 904, a Light Detection and Ranging (LIDAR) sensor 906 and a master controller 908. The LIDAR sensor 906 may be communicatively coupled with the master controller 908 through Ethernet Cabling 928 and may further be configured to send sensor data to the master controller 908. The LIDAR sensor 906 may be implemented through at least one third party LIDAR off the shelf component. The master controller 908 may be implemented using at least one processor.

In one or more embodiments, the Drive-By-Wire System 902 may comprise one or more components, but not limited to, a motor controller 910, a controller interface 912, a steering motor 914, a steering angle sensor (also referred as steering angle encoder) 916, a brake actuator 918 and an emergency stop device (or an emergency stop button) 920. The electric vehicle 904 may comprise a steering shaft 922, a brake pedal 924 and an accelerator pedal interface 926. The motor controller 910 may be implemented using a Smart drive. The controller interface 912 may be implemented using Delta PLC. The steering motor 914 may be an Electric Power Steering (EPS) motor. The steering angle sensor 916 (also referred as steering angle encoder) may be a rotary encoder, used to electronically monitor the position of a rotating shaft by converting shaft rotation into electronic pulses.

In one or more embodiments, the motor controller 910 may be communicatively coupled to steering motor 914 through cable(s) and may be configured to send electric signals 936 (0-12 v) to steering motor 914. The motor controller 910 may further be communicatively coupled to brake actuator 918 through cable(s) and configured to send electric signals 934 (0-12 v) to brake actuator 918. The controller interface 912 may be communicatively coupled with motor controller 910 through cable(s) and may be configured to send digital control signals 932 to motor controller 910. The controller interface 912 may further be configured to receive data in the form various other components such as the master controller 908, the steering angle sensor 916 and the emergency stop device 940. The controller interface 912 may be communicatively coupled with master controller 908 through serial connection 930 and may be configured to receive data from master controller 908. The controller interface 912 may be communicatively coupled to steering angle sensor 196 through cable(s) and may be configured to receive signals in terms of 8-bit grey code 938 indicating the angular position of the steering wheel or steering shaft 922. The controller interface 912 may be communicatively coupled to emergency stop device 920 through cable(s) and may be configured to receive electric signals 940 from the emergency stop device 920.

In one or more embodiments, the steering motor 914 and steering angle sensor 916 of the Drive-By-Wire system 902 may be mechanically coupled (944) to steering shaft of electric vehicle 904 as described in various embodiments of the present disclosure. The brake actuator 918 of the Drive-By-Wire system 902 may be mechanically coupled (946) to brake pedal 924 of the electric vehicle 904, as described in various embodiments of the present disclosure. Further, the controller interface 912 may be communicatively coupled to accelerator pedal interface 926 of the electric vehicle 926 through cable(s) and may be configured to send electric signals 942. The accelerator pedal interface 926 may be operated through a potentiometer (digital or analog).

In one or more embodiments, the hardware components of the integrated auto-steering, auto-braking and auto-acceleration mechanism may be controlled through the master controller 908. Based on the instructions from application which may be coupled with LIDAR 906, the master controller 908 may send one or more instructions to the controller interface 908, for example, when the steering shaft 922 to be moved 10 degrees towards right, the controller interface 912 may send instruction(s) to the motor controller 910 to cause steering motor to make 5 revolution further causing the gear connected to steering motor 914 to move in anti-clock-wise direction, which causes the steering shaft 922 to rotate in clock-wise direction making the vehicle to move 10 degrees towards right.

In one or more embodiments, the steering angle sensor (encoder) 916 may determine the angle of the steering shaft 922. For example, the steering angle sensor 916 may determine that the steering shaft 922 has rotated only for 9.5 degrees and there is a lag of 0.5 degrees. The steering angle sensor 916 may send instructions to the controller interface 912 that there is a lag of 0.5 degrees, for which the controller interface may send instructions to motor controller 910 which may cause steering motor 914 to rotate accordingly so that it results in rotation of steering shaft 922 by 0.5 degrees towards right, hence correcting the direction.

In one or more embodiments, one or more instructions may be sent from the controller interface 912 to the motor controller 910 and in turn to the brake actuator 918 for the linear actuation of the brake pedal 924. Act of apply or release (engage or disengage) of brake through the brake pedal 924 may be controlled by the controller interface 912. One or more instructions/electric signal of 0-5 volts may be communicated by controller interface 912 to the accelerator pedal interface 926 to accelerate or decelerate the electric vehicle 904, and the signal may be varied based on the movement of steering shaft 922 and brake pedal 924.

In one or more embodiments, the steering shaft 922, the brake pedal 924 and the accelerator pedal interface 926 may all be controlled simultaneously in various scenarios. For example, assume the electric vehicle needs to take a right turn at a junction of a road as determined by the LIDAR 906 and various components of the integrated system as described in earlier paragraphs with respect to FIG. 7. Now the electric vehicle 904 has to turn towards right automatically. Now, as indicated by the LIDAR 906, the master controller 908 may determine the distance of turning point on road from the current position of the electric vehicle and may determine the various aspects of steering, brake and accelerator, such as degree of rotation of the steering wheel required for turning of the vehicle to the right, linear actuation of the brake and the voltage for acceleration. Note that the steering angle sensor 916 is continuously measuring the angle of the steering shaft 922. The master controller 908 may send instructions to the controller interface 912. The controller interface 912 may communicate to the accelerator pedal interface 926 to either accelerate or decelerate, so that the vehicle speed is no further increased. The controller interface 912 may communicate to the motor controller 910 for the required rotation towards right, with the values for rotation converted to signals and linear actuation of brake. The motor controller 910 may communicate to the brake actuator 918 to engage brake pedal 924 so that the vehicle speed is brought down. Now, the motor controller 910 may simultaneously communicate to steering motor 914 to actuate the steering motor 914 to cause rotation of the steering shaft 922. The angle of the steering shaft 922, the brake pedal 924 and the accelerator pedal interface 926 may be continuously monitored and operated to achieve desired speed and direction of the electric vehicle 904.

Figure 10:
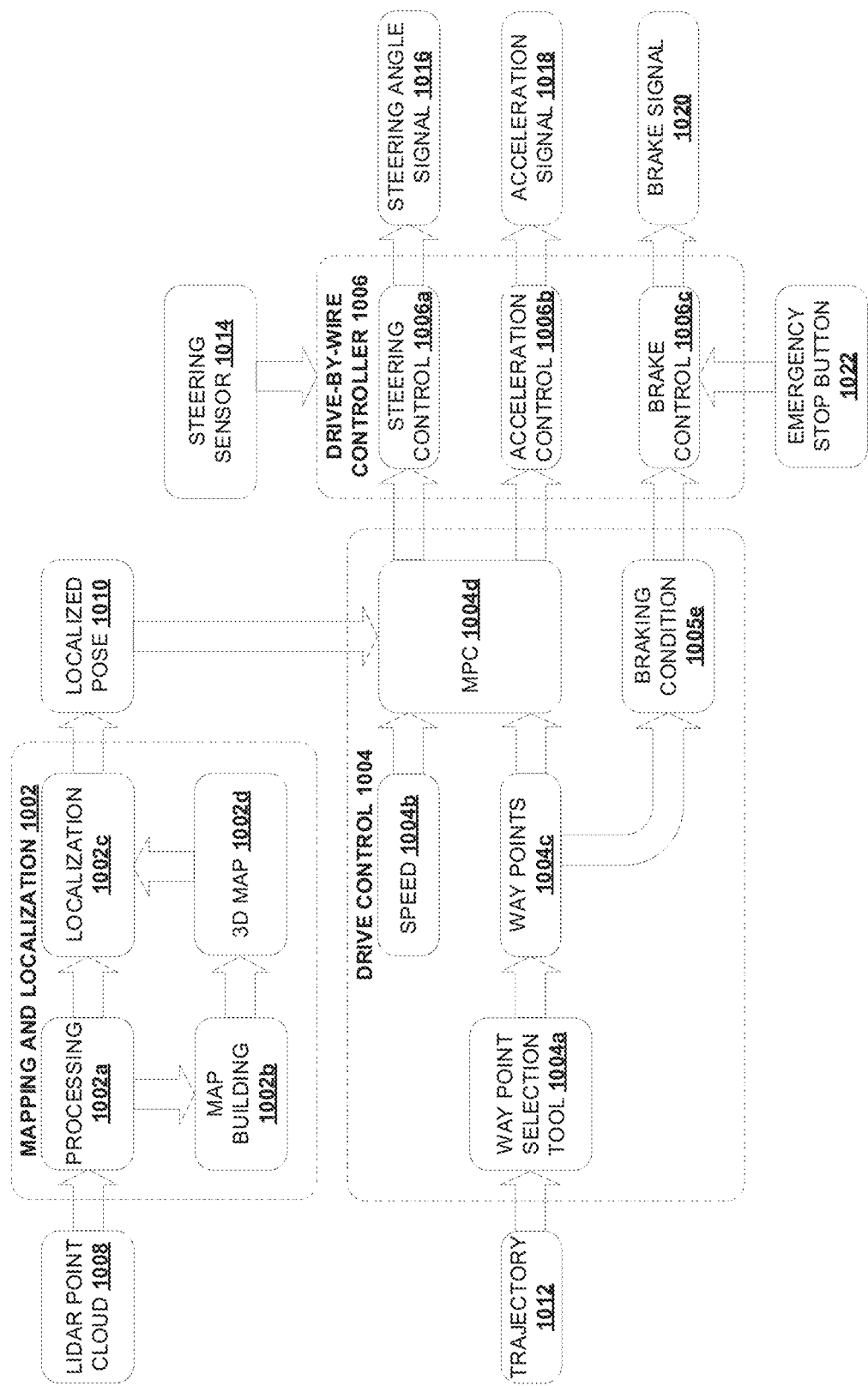
FIG. 10 is a software architecture diagram illustrating various component and communication between the components of the integrated system for auto-steering, auto-braking and auto-acceleration mechanism, according to one or more embodiments.

FIG. 10 is a software architecture diagram illustrating various component and communication between the components of the integrated system for auto-steering, auto-braking and auto-acceleration mechanism, according to one or more embodiments. In one or more embodiments, the integrated system may comprise various hardware/software modules such as, but not limited to mapping and localization module 1002, drive control module 1004, Drive-By-Wire controller 1006, LIDAR point cloud data 1008, localized pose (position and orientation) 1010, a trajectory data 1012, a steering sensor 1014, steering angle signal 1016, acceleration signal 1018, and brake signal 1020.

In one or more embodiments, the mapping and localization module 1002 may comprise various modules such as, but not limited to processing module 1002a, map building module 1002b, localization module 1002c, and 3D map 1002d. The drive control module 104 may comprise various components such as, but not limited to, way point selection tool 1004a, speed data 1004b, waypoints 1004c, an MPC program module 1004d and/or braking condition 1005e. The Drive-By-Wire Controller 1006 may comprise various components such as, but not limited to, steering control module 1006a, acceleration control module 1006b and/or brake control module 1006c.

In one or more embodiments, based on the LIDAR Point Cloud Data 1008, mapping and localization module 1002 may be configured to perform various operations as to build a localized POSE 1010 for the vehicle to navigate. The mapping and localization module 1002 may be configured to receive LIDAR point cloud data 1008, process the data (1002a) to build (1002b) a 3-Dimensional map 1002d which in turn is used to determine the position and orientation 1010 of the vehicle relative to the generated map through localization 1002c. The localized pose data 1010 may be sent to MPC program module 1004d which is part of drive control 1004, which may determine the speed 1004b at which the vehicle to be moved and what are the way points 1004c for navigation.

In one or more embodiments, the trajectory data 1021 may be provided as input to the waypoint selection tool 1004a configured to determine navigation path for vehicle. The generation of trajectory data 1021 may be based on point cloud density and the way point selection methods, and may be user driven activity. The speed data 1004b and the waypoints 1004c are provided as input to the MPC program 1004d, which is further configured to send one or more instructions to the steering control module 1006a and acceleration control module 1006b. The way points 1004c may also be provided as input to braking condition module 1005e, which may be configured to send instructions to brake control module 1006c which in turn is configured to send one or more brake signals 1020 to one or more apparatus associated auto-braking mechanism. Based on the instructions from the MPC program module 1004d and data from the steering sensor module 1014, the steering control module 1006a may be configured to send one or more steering angle signals to one or more apparatus associated with the auto-steering mechanism. Similarly, based on the instructions from MPC program module 1004d, the acceleration control module 1006b may be configured to send one or more acceleration signals 1018 to one or more apparatus associated with the auto-braking mechanism of the present disclosure. The signals or instructions received at one or more apparatus of integrated auto-steering, auto-braking and auto-acceleration mechanism may work together to cause the vehicle to navigate in defined manner.

In one or more embodiments, data required for navigation of a vehicle may pass through two phases—mapping and localization, which the mapping and localization module 1002 may be configured to perform. During the mapping phase, the LIDAR Point Cloud Data 1008 obtained from LIDAR scans may be used to build a 3D map through map building module 1002b. Each point cloud that is generated may be merged into a master 3D map based on alignment of one or more features such as, but not limited to points, planes, and/or edges. By traversing through region of interest, a complete 3D map may be built. One or more processing activities such as averaging, geometrical operations, filtering may be performed during mapping phase.

During localization phase, the 3D map may be used to determine the real-time position of the vehicle. The features perceived in the current LIDAR scans are searched within the 3D map and the current location is published as the AV-pose (Autonomous Vehicle—position and orientation). Differences between current and desired pose/sequences may be used in issuing corrective actions using the Model Predictive Controller. The corrective actions may be, but not limited to acceleration/deceleration and/or change in steering angle. The LIDAR data may also be used for obstacle detection, localization, and recognition. The detected obstacles may be used to trigger obstacle avoidance or emergency stop functions.

In one or more embodiments, the integrated system (also referred as 'Drive-By-Wire system') for autonomous vehicle is disclosed. The Drive-By-Wire system comprises one or more components such as, but not limited to, an auto-steering apparatus with integrated spur gears, an auto-braking apparatus with an electric actuator, an auto-acceleration apparatus, one or more sensors, one or more programmable logic controllers, one or more processors and/or one or more memory devices. At least one of one or more programmable logic controller and/or one or more processors may be configured to actuate at least one of the auto-steering apparatus, auto-braking apparatus and/or auto-acceleration apparatus. The actuation may cause at least one of change in position of the autonomous vehicle from a first position to a second position, change in direction of the orientation of the autonomous vehicle from a first direction of orientation to a second direction of orientation, and/or change in speed of movement of the autonomous vehicle. The actuation of at least one of the auto-steering, auto-braking and/or auto-acceleration apparatus may be in accordance with various embodiments described in the present disclosure. The actuation of the auto-steering apparatus may cause at least one programmable logic controller to send one or more instructions to Electric Power Steering motor associated with the auto-steering apparatus causing the rotation of the steering wheel thus resulting in change in direction of orientation of the autonomous vehicle. The actuation of the auto-braking apparatus may cause the at least one programmable logic controller to send one or more instructions to electric actuator associated with the auto-braking apparatus to either engage or disengage of brake of the autonomous vehicle further causing change in position of the autonomous vehicle. Further, the actuation of the auto-acceleration apparatus may cause the at least one programmable logic controller to send one or more instruction in the form of electric signals to auto-acceleration apparatus to either accelerate or decelerate the autonomous vehicle.

In case of change in position of the autonomous vehicle, the autonomous vehicle may change its position from one position to another position in real world (also referred as 'first position to second position'), relative to a determined map data and POSE (position and orientation) data. The autonomous vehicle may change its position as a result of—either the autonomous vehicle may be in movement and stops or the autonomous vehicle starts moving from halt. Here, at least one of various position of the autonomous vehicle may considered as either the first position or the second position. For example, if the autonomous vehicle starts moving as a result of actuation of at least one of auto-steering apparatus, auto-braking apparatus and/or auto-acceleration apparatus, the position of the vehicle when it was at stop position may be referred as first position and the subsequent position when the autonomous vehicle starts moving may be considered as a second position. The first position of the autonomous vehicle may be at least one geographical location of the vehicle with respect to 3D map created as descried in various embodiments of the present disclosure. Similarly, the second position of the autonomous vehicle may be at least one geographical location of the vehicle with respect to 3D map created as descried in various embodiments of the present disclosure, wherein the first position is different from the second position.

The first direction of orientation of the autonomous vehicle may be the direction of orientation of vehicle with respect to trajectory defined for the movement of the vehicle. Similarly, the second direction of orientation of the autonomous vehicle may be the direction of orientation of vehicle with respect to trajectory defined for the movement of the vehicle. The first direction of orientation may be different from the second direction of orientation of the autonomous vehicle. The change in direction of orientation of the autonomous vehicle is caused as a result of change in angle of rotation of steering wheel associated with the auto-steering apparatus of the present disclosure. For example, the autonomous vehicle may be navigating in a trajectory defined by the integrated system. Assume that the trajectory is defined to be straight line and the movement of autonomous vehicle is aligned to the defined trajectory. Here, the current orientation of the autonomous vehicle may be the first direction of orientation of the autonomous vehicle. The autonomous vehicle may change the direction of movement/orientation due to various reasons. It could be to keep the autonomous vehicle to navigate in defined trajectory, as the define trajectory may demand the autonomous vehicle to take either right or left turn by any angle, which may be achieved by rotation of steering wheel through auto-steering apparatus. The direction of orientation of the autonomous vehicle as a result of either left turn or right turn may be considered as a second direction of orientation of the autonomous vehicle.

In case of change in speed of movement of the autonomous vehicle, it may be result of either actuating the auto-braking apparatus which my result in either engage of disengage of the brake of the autonomous vehicle, which may in turn cause the autonomous vehicle to either accelerate or decelerate. Also, the change in speed of the autonomous vehicle may be a result of actuating the auto-acceleration apparatus resulting in either acceleration or deceleration of the autonomous vehicle.

In one or more embodiment, an auto-steering apparatus is disclosed. The apparatus may comprise one or more components, but not limited to, a steering wheel, a steering shaft (also referred as steering rod), a pair of universal joints, an Electric Power Steering (EPS) motor with a spur gear, a connecting rod integrated with a spur gear operatively coupled with the steering shaft and the EPS motor, at least one sensor and/or at least one programmable logic controller. The connecting rod with a spur gear may be mechanically coupled to steering shaft using a pair of universal joints, one at the top of the connecting rod towards the steering wheel and another at the bottom of the steering shaft towards tie rod end of the autonomous vehicle. The spur gear associated with the connecting rod in operatively coupled to the spur gear associated with the EPS motor. EPS motor is configured to receive one or more signals from the at least one programmable logic controller, causing the steering wheel to rotate in a first rotational direction or a direction opposite to the first rotational direction, further causing change in angle of orientation of the steering wheel. The angle of orientation of the steering wheel may be determined through at least one sensor. The number of rotations in the EPS motor may be determined by the programmable logic controller, based on at least one of the data received by the at least one sensor and/or Point Cloud Data/trajectory data provided as input to the at least one programmable logic controller.

In one or more embodiments, an auto-braking apparatus is disclosed. The apparatus may comprise one or more components, but not limited to, a brake pad, a brake pedal, a piston rod, a brake cylinder, and electric actuator and at least one programmable logic controller. The brake pad is mechanically coupled to one end of the brake pedal. The other end of the brake pedal may be mechanically coupled to the brake piston which in turn is connected to brake cylinder. The electric actuator may be operatively attached to the brake pedal which makes the brake autonomous. One end of the electric actuator is connected to the brake pedal towards the brake pad using a support clamp. Another end of the electric actuator is mechanically coupled to the another end of the brake pedal which is towards the brake piston using a pivot pin.

The electric actuator may be configured to receive one or more signals from the at least one programmable logic controller. Based on the received one or more signals, the electric actuator may cause the brake pedal to move in a first direction i.e. towards the brake cylinder, causing the brake of the autonomous vehicle to engage. The engage of the brake may cause the autonomous vehicle to either slowdown or stop. Also, based on the received one or more signals, the electric actuator also causes the brake pedal to move in a direction opposite to the first direction i.e. away from the brake cylinder, causing the brake of the autonomous vehicle to disengage. The disengage of the brake may allow the movement of the vehicle at a speed and direction as operated by the auto-acceleration apparatus and auto-steering apparatus respectively.

In one or more embodiments, an auto-acceleration apparatus is disclosed. The auto-acceleration apparatus may comprise, one or more components, but not limited to at least one programmable logic controller and/or an accelerator pedal interface. The at least one programmable logic controller may be configured to send one or more instruction in form of electric signals (0-5 v) to the accelerator pedal interface. As the at least one programmable logic controller is integrated with all three apparatus i.e., auto-steering, auto-braking and/or auto-acceleration apparatus, the at least one programmable logic controller may be configured to take decision on when to accelerate and when to decelerate based on the data from at least one sensor, and accordingly may send electric signals to the accelerator pedal interface either to accelerate or decelerate the autonomous vehicle. In one or more embodiments, an auto-acceleration apparatus for electric/autonomous vehicles may typically be controlled by a voltage signal, with amplitude of the signal proportional to a desired velocity. In one or more embodiments, the auto-acceleration apparatus may be provided appropriate voltage in 0-5V through the Digital-to-Analog Converter (DAC) interface of a Programmable Logic Controller represented in FIG. 6. Other acceleration control signals like current signal and digital signal can also be automated using this method.

In one or more embodiments, a computer implemented method for integrated auto-steering, auto-braking and auto-acceleration mechanism in an autonomous vehicle is disclosed. The method comprising steps wherein one or more position and orientation data of the autonomous vehicle may be received at the master controller. The master controller may be configured to receive one or more map related data such as Point Cloud Data from LIDAR. Mapping and localization may be performed on the received Point Cloud Data. During the mapping, the Point Cloud Data may be used to build a 3D map. Each generated Point Cloud Data may be merged into a master 3D map based on the alignment of features such as, but not limited to points, planes, and edges. By traversing through the region of interest, a complete 3D map is built. Processing such as averaging, geometrical operations, filtering may also be performed during the mapping. As a part of localization, the 3D map may be used to determine the real-time position of the vehicle. The features perceived in the LIDAR scans in real-time may be searched within the 3D map and the current location of the autonomous vehicle may be determined to generate position and orientation data of the autonomous vehicle.

The master controller may further be configured to receive one or more way points to determine trajectory of the autonomous vehicle. The user may select one or more way points through user interface associated with the master controller. A trajectory may be determined based on the selected one or more way points Based on the determined trajectory, the master controller may be configured to send one or more instructions to at least one of the auto-steering apparatus, the auto-braking apparatus and/or the auto-acceleration apparatus, through at least one programmable logic controller.

In one or more embodiments, based on the instruction received from the master controller, the auto-steering apparatus of the autonomous vehicle may cause the steering wheel to rotate towards a direction, by an angle, determined by the master controller. Similarly, based on the instruction received from the master controller, the auto-braking apparatus of the autonomous vehicle causes the autonomous vehicle to either slowdown the autonomous vehicle or stop the autonomous vehicle. Similarly, based on the instruction received from the master controller, the auto-acceleration apparatus of the autonomous vehicle causes either acceleration or deceleration of the autonomous vehicle through an accelerator pedal interface.

The rotation of the steering wheel may be caused by sending instructions from a master controller to a motor controller, through the at least one programmable logic controller, for operating steering shaft through a steering motor operatively coupled using integrated spur gear. The slowdown or stopping of the autonomous vehicle may be achieved, by sending instructions from the master controller to the motor controller, through the at least one programmable logic controller, for operating brake pedal through a brake motor operatively coupled with the brake pedal. The rotation of the steering wheel may further cause the autonomous vehicle to change the direction of movement, when the autonomous vehicle is in motion. The one or more position and orientation data of the autonomous vehicle and the one or more way points are processed using a model predictive control algorithm.

In an example embodiment, consider that the autonomous vehicle is positioned at a location. The master controller may receive Point Cloud Data from the LIDAR. The master controller may send instructions to LIDAR to receive LIDAR scans to determine position and orientation data (POSE) of the autonomous vehicle through mapping and localization as described in various embodiments of the present disclosed. Based on the user input by selection of way points, the master controller may determine the trajectory. Consider a case wherein the vehicle is in stop position and motor is in ON condition. Since the autonomous vehicle is in stop position, brake will be in engaged state, no acceleration and the angle of steering wheel of the vehicle is determined to be in zero degrees with respect to the direction of linear motion of the vehicle. The angle of the steering wheel may be determined using steering angle encoder. Based on the POSE data and trajectory the master controller may determine that the autonomous vehicle needs to move forward in straight line/direction and there is no need to rotate the steering wheel but brake needs to be disengaged and the autonomous vehicle needs to accelerate. The master controller may send instruction to a controller interface, which may be at least one programmable logic controller. The controller interface may send instructions at least one of auto-steering, auto-braking and/or auto-acceleration apparatus to achieve above mentioned actions. The controller interface may send instruction to all three apparatus in sequence or simultaneously. The order of sequence to send instructions to apparatus may be pre-defined by the user or may be determined dynamically in real-time by master controller. The controller interface may send one or more instructions in the form of digital signal to motor controller to not to actuate the steering motor (EPS motor) so that the steering angle remains in the same orientation without anti rotation. Alternatively, the controller interface may not send instructions to motor controller so that the EPS motor will not be actuated hence resulting in maintaining the orientation of the steering angle to cause autonomous vehicle to move forward in straight line. The controller interface may send one or more instructions to brake actuator through the motor controller to actuate the electric actuator to disengage the brake. Simultaneously, the controller interface may send one or more instructions as electric signal to accelerator pedal interface to accelerate the autonomous vehicle so that the autonomous vehicle starts moving in the direction of the defined trajectory.

In an example embodiment, consider that there is an obstacle in front of the autonomous vehicle. The obstacle could be static, for example—an object fallen on road, or a barricade near parking. The obstacle could be dynamic, for example—any moving object that comes across the autonomous vehicle such as person crossing road. In such scenarios, the autonomous vehicle could be moving in a direction/path defined by the trajectory. One or more obstacles may be determined by the master controller based on data obtained from LIDAR scan in real-time, as LIDAR scan is performed continuously in real-time and LIDAR scan data may be analyzed by the master controller continuously in real-time. The master controller may detect one or more obstacles and may determine how to operate one or more apparatus such as auto-steering, auto-braking and/or auto-acceleration apparatus. In order to stop the autonomous vehicle, the master controller may send one or more instructions to steering motor through controller interface to hold the steering wheel without any change in the angle of orientation of the steering wheel. The master controller may send one or more instructions to accelerator pedal interface to decelerate the vehicle. The master controller may also send one or more instructions as electric signals to electric actuator of the auto-braking mechanism (brake actuator) through the motor controller to actuate the brake. After receiving instructions from the motor controller, the electric actuator may actuate the brake i.e. the brake pedal is made to move in a first direction to engage the brake as described in various embodiments of the present disclosure. The action of engaging the brake may cause the autonomous vehicle to stop moving. After the clearance of obstacle or by detecting the alternate trajectory for the autonomous vehicle, the master controller may send instructions to one or more apparatus such as auto-steering, auto-braking and auto-acceleration apparatus to further cause the autonomous vehicle to move.

In an example embodiment, consider that the master controller determines that the autonomous vehicle need to take a deviation to left as there would be a deviation in the road/surface, as per the LIDAR scan data. After determining the deviation to be taken in the direction of movement of the autonomous vehicle to stay in the defined trajectory, the master controller may further determine the angle of rotation of the steering wheel required. The master controller may be in continuous communication with every sensor and apparatus. The master controller may receive current angle of steering wheel through a steering angle encoder associated with the auto-steering apparatus. After receiving the trajectory data and the data from steering angle encoder, the master controller may determine the required angle of rotation of steering wheel and also the number of rotations required in the EPS motor to achieve the required angle of rotation. For example, based on one or more parameters associated with gar train and other aspects associated with the auto-steering apparatus, the master controller may determine that the steering wheel to be rotated to left by 'x' degrees and the EPS motor to be operated for 'y' number of rotations to cause the steering wheel to rotate by 'x' degrees. In order to achieve the desired movement of vehicle in the trajectory i.e. the deviation on road, the master controller may send one or more signals to the accelerator pedal interface to decelerate the autonomous vehicle. Further, the master controller may send one or more instructions as electric signals to the steering motor through controller interface. The motor controller may send one or more signals to the EPS motor to rotate 'y' number of rotations. The EPS motor with spur gear may be operatively coupled to the connecting rod of the steering shaft with the spur gear. Only two spur gears in the present example embodiment may transform the clockwise rotation of the spur gear of the electric motor to anti-clockwise rotation of the spur gear of the connecting rod, further causing the steering wheel to rotate in anti-clockwise direction. The number of spur gears may vary the resultant direction of rotation. Based on the instructions from the motor controller, the EPS motor may rotate 'y' number of rotations causing the spur gear of the steering wheel to rotate in clockwise direction and this may further cause the steering wheel to rotate for 'x' degrees to the left. With the controlled brake and acceleration of the autonomous vehicle, the rotation of steering wheel may cause the autonomous vehicle to move towards left to stay in the defined trajectory. Post the deviation is achieved, to bring back the autonomous vehicle to straight movement, the master controller may further obtain LIDAR scan data and may also measure the angle of steering wheel to determine the next required rotation of the steering wheel. Unless there are correction required in the angle of steering wheel due to unexpected obstacles on the road which may cause the change of angle of steering wheel, the master controller may rotate the steering wheel back by 'x' degrees. If any corrections to be required in the rotation of the steering wheel, the degrees of rotation required may be 'x±correction angle'. The master controller, based on the LIDAR scan data and angle of steering wheel determined by the steering angle encoder may determine the degree of rotation of steering wheel and may send instruction to EPS motor through controller interface and motor controller to rotate the steering wheel in clockwise direction to achieve the movement of the autonomous vehicle in a determined trajectory. Further the master controller may send one or more instructions to auto-braking apparatus to disengage the brake and may send one or more instructions to auto-acceleration apparatus to accelerate the autonomous vehicle.

In one or more embodiments, multiple combination of simultaneous communication with auto-steering, auto-braking and auto-acceleration mechanism is possible, so that the apparatus work in an integrated manner.

In one or more embodiments, one or more sensors may be configured to measure the life of components for diagnostics and prognostics. Further, improved material and design optimization may be performed to reduce weight and increase strength to get the advantage of cost and improve run time of vehicle.

The advantage of the invention described in the present disclosed is that number of components used to achieve the objective is less, the auto-steering, auto-braking and auto-acceleration mechanism and the related apparatus can be retro fit easily to existing components of the vehicle. The integrated spur gear is used to avoid backlash and can be fit into any type of vehicle with minimal customization. The assembly is secured and is located beneath the vehicle.

The specification and drawings in the present disclosure are to be regarded in an illustrative rather than a restrictive sense.

What is claimed is:

1. A Drive-By-Wire system for an autonomous vehicle, comprising:
    an auto-steering apparatus comprises a connecting rod with a first spur gear operatively coupled through a second spur gear to an Electric Power Steering (EPS) motor, wherein the connecting rod with the spur gear is coupled to a steering shaft using a pair of universal joints;
    an auto-braking apparatus with an electric actuator;
    an auto-acceleration apparatus;
    at least one sensor;
    at least one programmable logic controller;
    at least one processor; and
    at least one memory unit communicatively coupled with the at least one programmable logic controller and the at least one processor and having instructions stored thereon, when executed cause at least one programmable logic controller or the at least one processor to:
        actuate, through one of the at least one programmable logic controller at least one of the auto-steering apparatus, the auto-braking apparatus or the auto-acceleration apparatus, wherein the actuation causing at least one of:
            change a position of the autonomous vehicle from a first position to second position,
            change a direction of the orientation of the autonomous vehicle from a first direction of orientation to a second direction of orientation, or
            change a speed of movement of the autonomous vehicle.

2. The system of claim 1, wherein the change in direction of orientation of the autonomous vehicle is caused as a result of change in angle of rotation of steering wheel associated with the auto-steering apparatus.

3. The system of claim 1, wherein the EPS motor is communicatively coupled to the at least one programmable logic controller to operate the EPS motor through electric signals.

4. The system of claim 1, wherein the auto-braking apparatus, comprises:
    a brake cylinder;
    a piston rod mechanically coupled to the brake cylinder;
    a brake pedal mechanically coupled to the piston rod;
    a brake pad mechanically coupled to the brake pedal;
    at least one programmable logic controller; and
    an electric actuator, configured to receive one or more electric signals from the at least one programmable logic controller,
        wherein one end of the electric actuator is mechanically coupled to a first end of the brake pedal using a support clamp and another end of the electric actuator is mechanically coupled to second end of the brake pedal using a pivot pin,
        wherein, based on the received one or more signals, the electric actuator causes at least one of:
            pushing the brake pad coupled to the brake pedal in a first direction, causing the brake of the autonomous vehicle to engage, or
            pulling the brake pad coupled to the brake pedal in a direction opposite to the first direction, causing the brake of the autonomous vehicle to disengage.

5. The system of claim 4, wherein the engage of the brake may cause the autonomous vehicle to either slowdown or stop.

6. The system of claim 4, wherein the first end of the brake pedal is positioned in a direction opposite to the brake piston.

7. The system of claim 4, wherein the second end of the brake pedal is mechanically coupled to the brake piston.

8. The system of claim 4, wherein first direction of movement of the brake pad is in the direction opposite to the brake cylinder.

9. An auto-steering apparatus with integrated spur gears, comprises:
    a steering wheel;
    a steering shaft;
    a pair of universal joints;
    an Electric Power Steering (EPS) motor with a spur gear;
    a connecting rod integrated with a first spur gear operatively coupled with the steering shaft and with a second spur gear to the EPS motor, wherein the connecting rod with the spur gear is coupled to a steering shaft using a pair of universal joints;
    at least one sensor; and
    at least one programmable logic controller,
    wherein the connecting rod is mechanically coupled to the steering shaft at one end and to a tie rod at another end through the pair of universal joints,
    wherein the spur gear associated with the connecting rod is operatively coupled to the spur gear associated with the EPS motor,
    wherein the EPS motor is configured to receive one or more signals from the at least one programmable logic controller, causing the steering wheel to rotate in a first rotational direction or a direction opposite to the first rotational direction, further causing change in angle of orientation of the steering wheel.

10. The apparatus of claim 9, wherein angle of orientation of the steering wheel is determined through the at least one sensor.

11. The apparatus of claim 9, wherein, number of rotations in the EPS motor is determined by the at least one programmable logic controller, based on at least one of:
    data received by the at least one sensor or
    point cloud data received by the at least one sensor.

12. A computer implemented method for integrated auto-steering, auto-braking and auto-acceleration mechanism in an autonomous vehicle, comprising;

receiving, at a master controller, one or more position and orientation data of the autonomous vehicle;

receiving, at the master controller, one or more way points to determine trajectory of the autonomous vehicle; and based on the determined trajectory, sending instructions by the master controller, through at least one programmable logic controller, to at least one of:

auto-steering apparatus of the autonomous vehicle, causing the steering wheel to rotate towards a direction, by an angle, determined by the master controller, wherein the auto-steering apparatus comprises a connecting rod with a spur gear operatively coupled through another spur gear to an Electric Power Steering (EPS) motor, wherein the connecting rod with the spur gear is coupled to a steering shaft using a pair of universal joints, auto-braking apparatus of the autonomous vehicle, causing the autonomous vehicle to either slowdown the speed of the autonomous vehicle or stop the autonomous vehicle, or auto-acceleration apparatus of the autonomous vehicle, causing either acceleration or deceleration of the autonomous vehicle through an accelerator pedal interface.

13. The computer implemented method of claim 12, the rotation of the steering wheel is caused by sending instructions from a master controller to a motor controller, through the at least one programmable logic controller, for operating a steering shaft through the EPS motor operatively coupled using the spur gear.

14. The computer implemented method of claim 12, wherein the slowdown or stopping of the autonomous vehicle is caused, by sending one or more instructions from the master controller to the motor controller, through the at least one programmable logic controller, for operating brake pedal through a brake actuator operatively coupled with the brake pedal.

15. The computer implemented method of claim 12, wherein the rotation of the steering wheel, further causing the autonomous vehicle to change the direction of movement, when the autonomous vehicle is in motion.

16. The computer implemented method of claim 12, wherein the one or more position and orientation data of the autonomous vehicle and the one or more way points are processed using a model predictive control algorithm.

* * * * *